United States Patent [19]
Furuta et al.

[11] Patent Number: 5,588,090
[45] Date of Patent: Dec. 24, 1996

[54] SIGNAL PROCESSING APPARATUS

[75] Inventors: Toshiyuki Furuta; Shuji Motomura, both of Yokohama; Takahiro Watanabe, Sagamihara, all of Japan; David G. Stork, Menlo Park, Calif.

[73] Assignee: Ricoh Company, Ltd., Tokyo, Japan

[21] Appl. No.: 246,342

[22] Filed: May 19, 1994

[30] Foreign Application Priority Data

| May 20, 1993 | [JP] | Japan | 5-118087 |
| Aug. 20, 1993 | [JP] | Japan | 5-206282 |
| Apr. 12, 1994 | [JP] | Japan | 6-073135 |

[51] Int. Cl.⁶ .................................................. G06F 15/18
[52] U.S. Cl. .............................. 395/23; 395/22; 395/27
[58] Field of Search ............................. 395/27, 23, 24, 395/26, 11, 22

[56] References Cited

U.S. PATENT DOCUMENTS

| 4,737,929 | 4/1988 | Denker | 395/27 |
| 5,167,006 | 11/1992 | Furuta et al. | 395/11 |
| 5,259,064 | 11/1993 | Furuta et al. | 395/22 |
| 5,283,855 | 2/1994 | Motomura et al. | 395/27 |
| 5,349,646 | 9/1994 | Furuta et al. | 395/22 |
| 5,384,896 | 1/1995 | Sakaue et al. | 395/24 |

FOREIGN PATENT DOCUMENTS

| 62-159198 | 7/1987 | Japan . |
| 62-295188 | 12/1987 | Japan . |

*Primary Examiner*—Robert W. Downs
*Assistant Examiner*—Sanjiv Shah
*Attorney, Agent, or Firm*—Woodcock Washburn Kurtz Mackiewicz & Norris

[57] ABSTRACT

A signal processing apparatus has a circuit network which is formed by connecting a plurality of neuron units into a network, each of the neuron being provided with a self-learning means having a weight function varying means and a weight function generating means for generating a variable weight function of the weight function varying means, on the basis of a positive or negative error signal obtained as a result of the comparison between an output signal and a teaching signal. In order to obtain a positive error signal $\delta_{j(+)}$ and a negative error signal $\delta_{j(-)}$, there is provided a differential coefficient calculating means for calculating two kinds of differential coefficients for a neuron response function, the calculation being done on the basis of the output signal from the neuron unit.

10 Claims, 31 Drawing Sheets

INPUT                                           OUTPUT

SIGNAL PROCESSING APPARATUS

BACKGROUND OF THE INVENTION

The present invention relates to signal processing apparatus such as a neural computer modeled on a neural network, which apparatus is applicable to the recognition of characters and drawings, the motion control of robots or the like, and memory by association.

An artificial neural network is constructed such that functions of neurons which are basic units of information processing in a living body are simulated in the form of elements resembling neurons, and such that these elements are put together in a network so that parallel information processing can be carried out. In a living body, processes such as character recognition, memory by association and control of motion can be carried out quite easily. However, such processes are often extremely difficult to carry out on Neumann computers. In order to cope with these problems, attempts are rigorously carried out for simulating functions characteristic of a living body, that is, parallel processing and self learning, which are effected by a nervous system of a living body. However, such attempts are in many cases realized by computer simulations. In order to bring out the advantageous features of the neural network, it is necessary to realize the parallel processing by hardware. Some proposals have been made to realize the neural network by hardware, however, the proposed neural networks cannot realize the self learning function which is an advantageous feature of the neural network. Further, the majority of the proposed networks are realized by analog circuits and has a problem of unfavorable operation.

A detailed discussion of the above points follows. First, a description will be given of a model of a conventional neural network. FIG. 1 shows one neuron unit (an element resembling a neuron) 1, and FIG. 2 shows a neural network which is made up of a plurality of such neuron units 1. Each neuron unit 1 of the neural network is coupled to and receives signals from a plurality of neuron units 1, and outputs a signal by processing the received signals. In FIG. 2, the neural network has a hierarchical structure, and each neuron unit 1 receives signals from the neuron units 1 located in a previous layer shown on the left side and outputs a signal to the neuron units 1 located in a next layer shown on the right side.

In FIG. 1, $T_{ij}$ denotes a weight function which indicates the intensity of coupling (or weighting) between an ith neuron unit and a jth neuron unit. The coupling between first and second neuron units is referred to as an excitatory coupling when a signal output from the second neuron unit increases as a signal received from the first neuron unit increases. On the other hand, the coupling between the first and second neuron units is referred to as an inhibitory coupling when the signal output from the second neuron decreases as the signal received from the first neuron unit increases. $T_{ij}>0$ indicates the excitatory coupling, and $T_{ij}<0$ indicates the inhibitory coupling. When an output signal of the ith neuron unit 1 is denoted by $y_i$, the input signal to the jth neuron unit 1 from the ith neuron unit 1 can be described by $T_{ij}y_i$. Since a plurality of neuron units 1 are coupled to the jth neuron unit 1, the input signals to the jth neuron unit 1 can be described by $\Sigma T_{ij}y_i$. The input signals $\Sigma T_{ij}y_i$ to the jth neuron unit 1 will hereinafter be referred to as an internal potential $u_j$ of the jth neuron unit 1 as defined by the following equation (1).

$$u_j = \Sigma T_{ij} Y_i \tag{1}$$

Next, it will be assumed that a non-linear process is carried out on the input. The non-linear process is described by a non-linear neuron response function using a sigmoid function as shown in FIG. 3 and the following equation (2).

$$f(x) = 1/(1+e^{-x}) \tag{2}$$

Hence, in the case of the neural network shown in FIG. 2, the equations (1) and (2) are successively calculated for each weight function $T_{ij}$ so as to obtain a final result.

FIG. 4 shows an example of a conventional neuron unit proposed in a Japanese Laid-Open Patent Application No.62-295188. The neuron unit includes a plurality of amplifiers 2 having an S-curve transfer function, and resistive feedback circuit network 3 which couples outputs of each of the amplifiers 2 to inputs of amplifiers in another layer as indicated by a one-dot chain line. A time constant circuit 4 made up of a grounded capacitor and a grounded resistor is coupled to an input of each of the amplifiers 2. Input currents $I_1, I_2, \ldots, I_N$ are respectively supplied to the inputs of the amplifiers 2, and the output is derived from a collection of output voltages of the amplifiers 2.

An intensity of the input signal and the output signal is described by a voltage, and an intensity of the coupling (or weighting) between the neuron units is described by a resistance of a resistor 5 (a lattice point within the resistive feedback circuit network 3) which couples the input and output lines of the neuron units. A neuron response function is described by the transfer function of each amplifier 2. In addition, the coupling between the neuron units may be categorized into the excitatory and inhibitory couplings, and such couplings are mathematically described by positive and negative sings on weight functions. However, it is difficult to realize the positive and negative values by the circuit constants. Hence, the output of the amplifier 2 is distributed into two signals, and one of the two signals is inverted so as to generate a positive signal and a negative signal. One of the positive and negative signals derived from each amplifier 2 is appropriately selected. Furthermore, an amplifier is used to realize the sigmoid function shown in FIG. 3.

However, the above described neuron unit suffers from the following problems.

1) The weight function $T_{ij}$ is fixed. Hence, a value which is learned beforehand through a simulation or the like must be used for the weight function $T_{ij}$, and a self-learning cannot be made.

2) When the accuracy and stability of one neuron unit are uncertain, new problems may arise when a plurality of such neuron units are used to form the neural network. As a result, the operation of the neural network becomes unpredictable.

3) When the neural network is formed by a large number of neuron units, it is difficult to obtain the large number of neuron units which have the same characteristic.

4) Because the signal intensity is described by an analog value of the potential or current and internal operations are also carried out in the analog form, the output value easily changes due to the temperature characteristic, the drift which occurs immediately after the power source is turned ON and the like.

On the other hand, as a learning rule used in numerical calculations, there is a method called back propagation which will be described hereunder.

First, the weight functions are initially set at random. When an input is supplied to the neural network in this state, the resulting output is not necessarily a desirable output. For example, in the case of character recognition, a resulting output "the character is 'L'" is the desirable output when a handwritten character "L" is the input, however, this desirable output is not necessarily obtained when the weight functions are initially set at random. Hence, a correct solution (teaching signal) is input to the neural network and the weight functions are varied so that the correct solution is output when the input is the same. The algorithm for obtaining the varying quantity of the weight functions is called the back propagation.

For example, in the hierarchical neural network shown in FIG. 2, the weight function $T_{ij}$ is varied using the equation (4) so that E described by the equation (3) becomes a minimum when the output of the jth neuron unit in the output (last) layer is denoted by $y_j$ and the teaching signal with respect to this jth neuron unit is denoted by $d_j$.

$$E=\Sigma(d_j-y_j)^2 \qquad (3)$$

$$\Delta T_{ij}=\delta E/\delta T_{ij} \qquad (4)$$

Particularly, when obtaining the weight functions of the output layer and the layer immediately preceding the output layer, an error signal $\delta$ is obtained using the equation (5), where f' denotes a first order differential function of the sigmoid function f.

$$\delta_j=(d_j-y_j)\times f'(u_j) \qquad (5)$$

When obtaining the weight functions of the layers preceding the layer which immediately precedes the output layer, the error signal $\delta$ is obtained using the equation (6).

$$\delta_j=\Sigma\delta_j T_{ij}\times f'(u_j) \qquad (6)$$

The weight function $T_{ij}$ is obtained from the equation (7) and varied, where $T_{ij}'$ and $T_{ij}'$ are values respectively obtained during the previous learning, $\eta$ denotes a learning constant and $\alpha$ denotes a stabilization constant.

$$\Delta T_{ij}=(\delta_j y_i)+\alpha T_{ij}'$$

$$T_{ij}=T_{ij}'+T_{ij} \qquad (7)$$

The constants $\eta$ and $\alpha$ are obtained through experience since these constants $\eta$ and $\alpha$ cannot be obtained logically.

The neural network learns in the above described manner, and an input is thereafter applied again to the neural network to calculate an output and learn. By repeating such an operation, the weight function $T_{ij}$ is determined such that a desirable resulting output is obtained for a given input.

When an attempt is made to realize the above described learning function, it is extremely difficult to realize the learning function by a hardware structure since the learning involves many calculations with the four fundamental rules of arithmetics.

On the other hand, a neural network realized by digital circuits has been proposed. A description will now be given, with reference to FIGS. 5 through 7, of such digital neural networks. FIG. 5 shows a circuit construction of a single neuron. In FIG. 5, each synapse circuit 6 is coupled to a cell circuit 8 via a dendrite circuit 7. FIG. 6 shows an example of the synapse circuit 6. In FIG. 6, a coefficient multiplier circuit 9 multiplies a coefficient a to an input pulse f, where the coefficient a is "1" or "2" depending on the amplification of a feedback signal. A rate multiplier 10 receives an output of the coefficient multiplier circuit 9. A synapse weighting register 11 which stores a weight function w is connected to the rate multiplier 10. FIG. 7 shows an example of the cell circuit 8. In FIG. 7, a control circuit 12, an up/down counter 13, a rate multiplier 14 and a gate 15 are successively connected in series. In addition, an up/down memory 16 is connected as shown.

In this proposed neural network, the input and output of the neuron circuit is described by a pulse train, and the signal quantity is described by the pulse density of the pulse train. The weight function is described by a binary number and stored in the memory 16. The input signal is applied to the rate multiplier 14 as the clock and the weight function is applied to the rate multiplier 14 as the rate value, so that the pulse density of the input signal is reduced depending on the rate value. This corresponds to the term $T_{ij}y_i$ of the back propagation model. The portion which corresponds to $\Sigma$ of $\Sigma T_{ij}y_i$ is realized by an OR circuit which is indicated by the dendrite circuit 7. Because the coupling may be excitatory or inhibitory, the circuit is divided into an excitatory group and an inhibitory group and an OR operation is carried out independently for the excitatory and inhibitory groups. Outputs of the excitatory and inhibitory groups are respectively applied to up-count and down-count terminals of the counter 13 and counted in the counter 13 which produces a binary output. The binary output of the counter 13 is again converted into a corresponding pulse density by use of the rate multiplier 14. A plurality of the neurons described above are connected to form a neural network. The learning of this neural network is realized in the following manner. That is, the final output of the neural network is input to an external computer, a numerical calculation is carried out within the external computer, and a result of the numerical calculation is written into the memory 16 which stores the weight function. Accordingly, this neural network does not have the self-learning function. In addition, the circuit construction of this neural network is complex because a pulse density of a signal is once converted into a numerical value by use of a counter and the numerical value (binary number) is again converted back into a pulse density.

Therefore, the conventional neural network or neural network suffers from the problem in that the self-learning function cannot be realized by hardware. Furthermore, the analog circuits do not provide stable operations, and the learning method using numerical calculation is extremely complex and is unsuited to be realized by hardware. On the other hand, the circuit construction of the digital circuits which provide stable operations is complex.

Attempts to resolve the above-mentioned problems include the proposals disclosed in the Japanese Laid-Open Patent Application No.4-549 (Basics of forward process) which discloses a pulse-density type neuron model capable of self-learning, and the Japanese Laid-Open Patent Application No.4-111185 (Basics of learning process), both of these proposals being made by the present applicants.

When a learning occurs in these neural networks, a differential coefficient, obtained by differentiating an output signal from a neuron with respect to an internal potential, is used to calculate an error signal. A disadvantage of the aforementioned proposals is that this differential coefficient is set to be constant. Therefore, the learning capability is not satisfactorily high, thus leaving much to be desired.

SUMMARY OF THE INVENTION

Accordingly, it is a general object of the present invention to provide a novel and useful signal processing apparatus in which the problems described above are eliminated.

Another and more specific object of the present invention is to provide a signal processing apparatus having a circuit network formed by connecting a plurality of neuron units into a network, the neuron unit being provided with self-learning means which comprises:

weight function varying means for varying a weight function of neurons; and weight function generating means which generates a variable weight function for the weight function varying means, on the basis of a positive or negative error signal obtained as a result of the comparison between an output signal and a teaching signal, the signal processing apparatus being provided with differential coefficient calculating means for calculating two kinds of differential coefficients of a neuron response function, on the basis of an output signal from neuron units so that the positive and negative error signals can be generated.

According to the signal processing apparatus of the present invention, it is possible to simulate the function, including the self-learning function, of neurons in a living body.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

A first embodiment of the invention claimed in claim 1 through 4 will be described with reference to FIGS. 8 through 39. The idea behind the construction and function of the conventionally proposed neuron basically applies to a neuron unit (element resembling a neuron), of the present invention, having the function of learning. This idea behind the construction and function will first be described along with the features of the present invention, with reference to FIG. 8 through 37C. A neural network formed of neuron units realized by a digital logic circuit is constructed such that signal processing means formed of a plurality of neurons realized by a digital logic circuit are connected to each other to form a network, the digital logic circuit being provided with a self-earning circuit having a weight function varying circuit and a weight function generating circuit for generating a variable weight function value of the weight function varying circuit on the basis of a positive and negative error signals obtained through comparison with a teaching signal.

The neuron unit is realized by use of digital circuits according to the following rules (1) through (6).

(1) Input and output signals of the neuron unit, intermediate signals within the neuron unit, the weight function, the teaching signal and the like all take the form of a pulse train described by binary values "0" and "1".

(2) The signal quantity within the neural network is expressed by the pulse density, that is, the number of "1"s within a predetermined time.

(3) The calculation within the neuron unit is described by a logic operation of pulse trains.

(4) The pulse train expressing the weight function is stored in a memory.

(5) The learning is realized by rewriting the pulse train of the weight function stored in the memory.

(6) When learning, an error is calculated based on a pulse train of the given teaching signal, and the pulse train of the weight function is varied depending on the calculated error. The calculation of the error and the calculation of the deviation of the weight function are carried out by logic operations of pulse trains described by "0"s and "1"s.

An explanation of the rules will be given. First, a description will be given of a signal processing by means of a digital logic circuit, particularly, the signal processing in a forward process.

Figure 1:
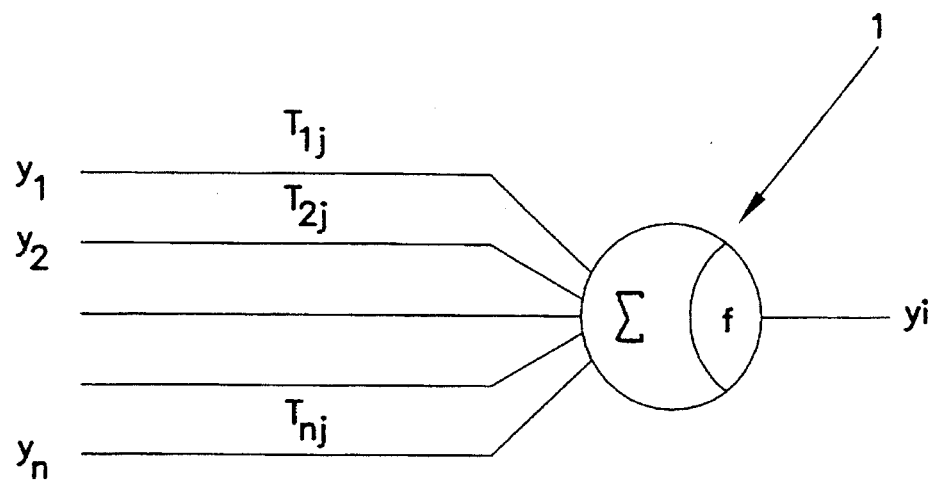
FIG. 1 is a schematic diagram showing the construction of a conventional neuron unit.
Figure 2:
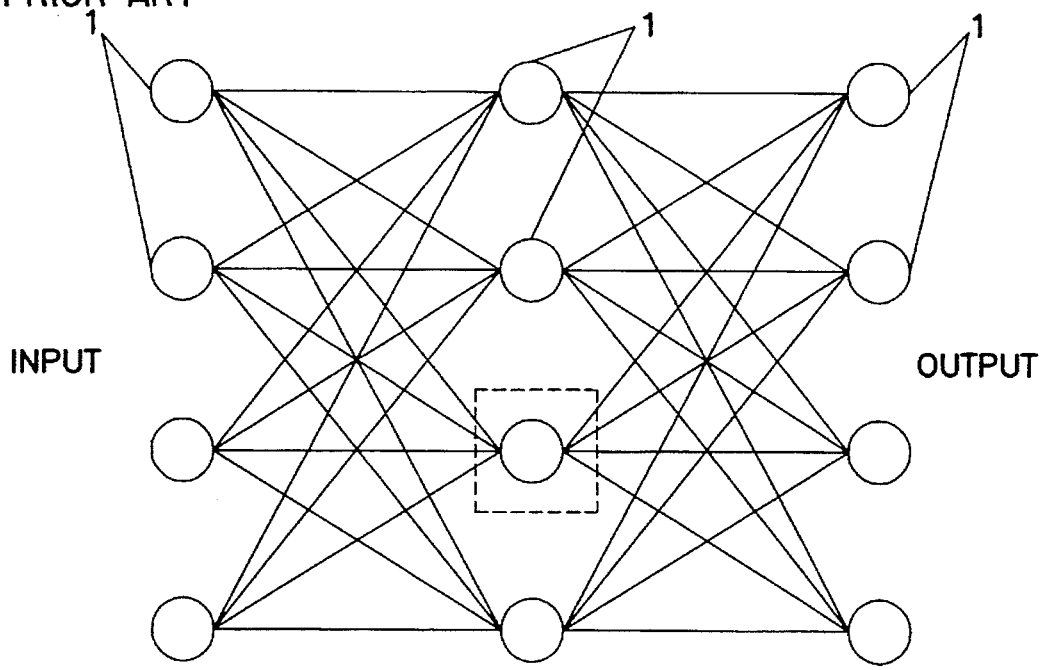
FIG. 2 is a schematic diagram showing the construction of a neural network formed of the neuron of FIG. 1.
Figure 3:
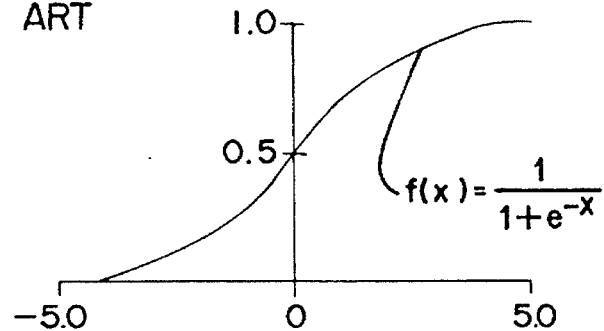
FIG. 3 is a graph showing a sigmoid function.
Figure 4:
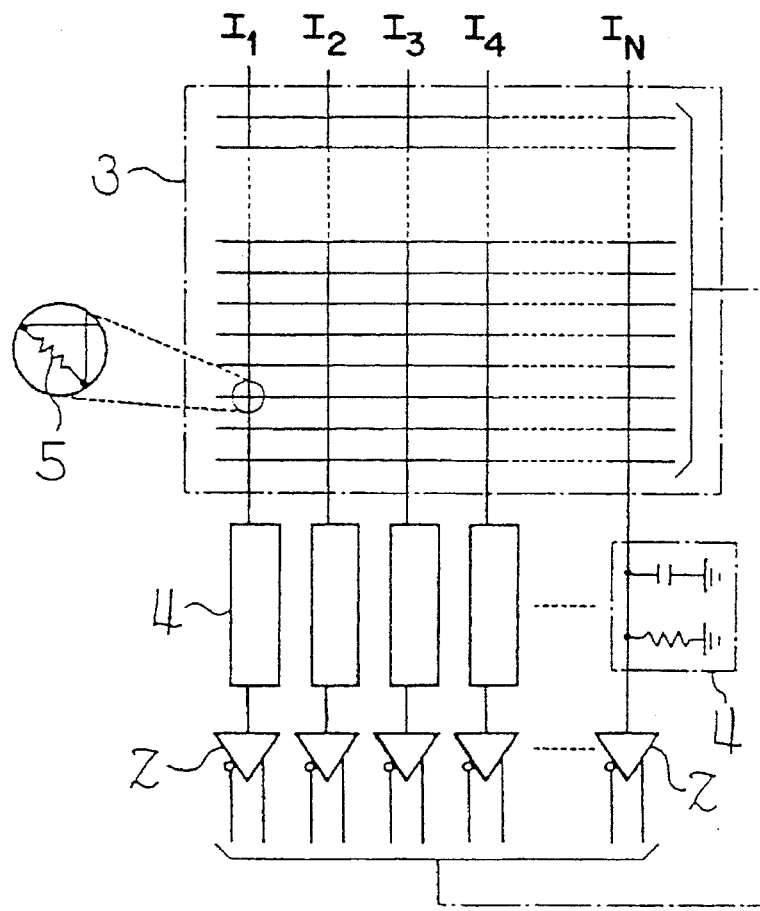
FIG. 4 is a circuit diagram showing the specific construction of a neuron unit.
Figure 5:
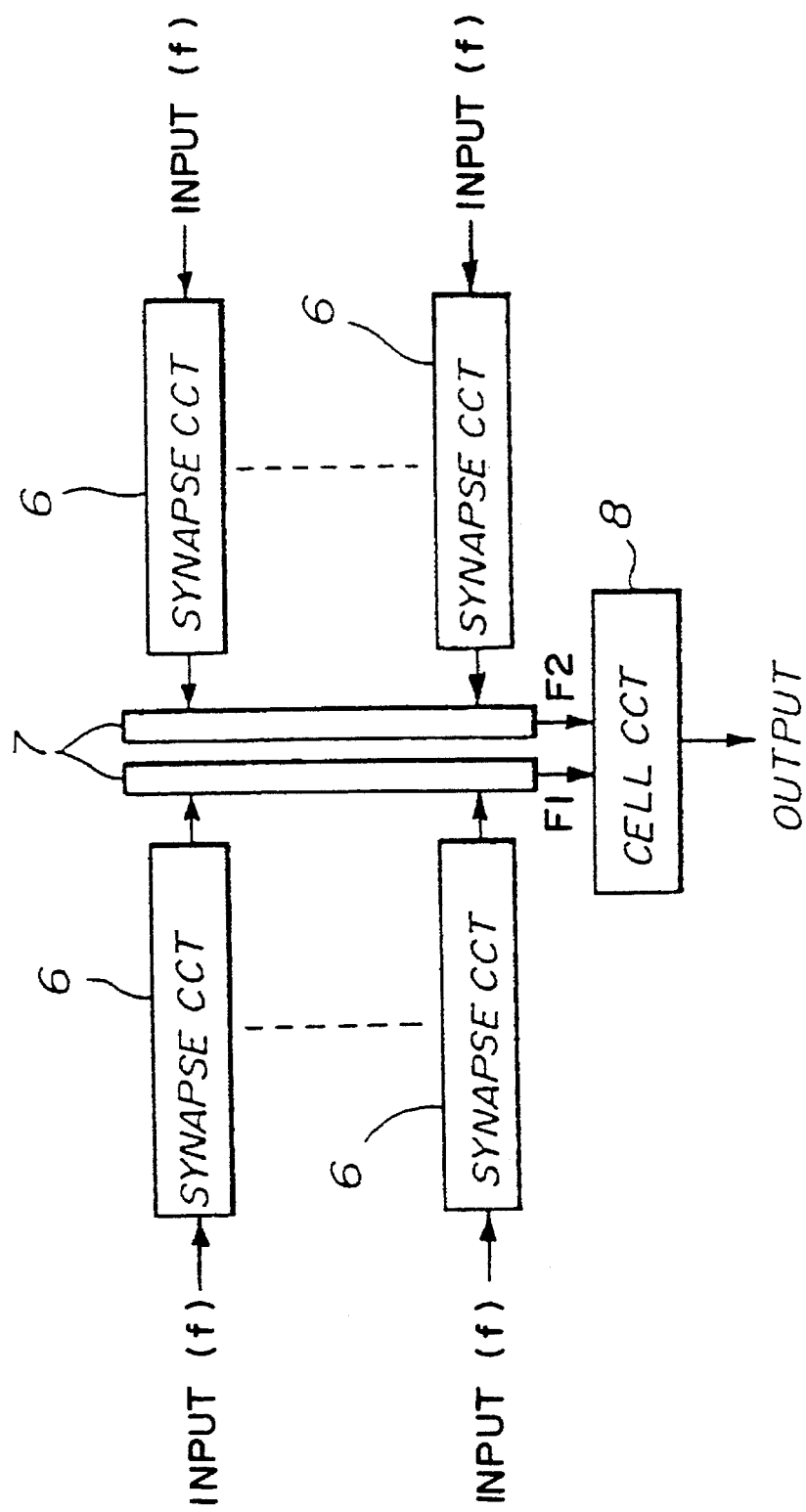
FIG. 5 is a block diagram showing an example of digital construction.
Figure 6:
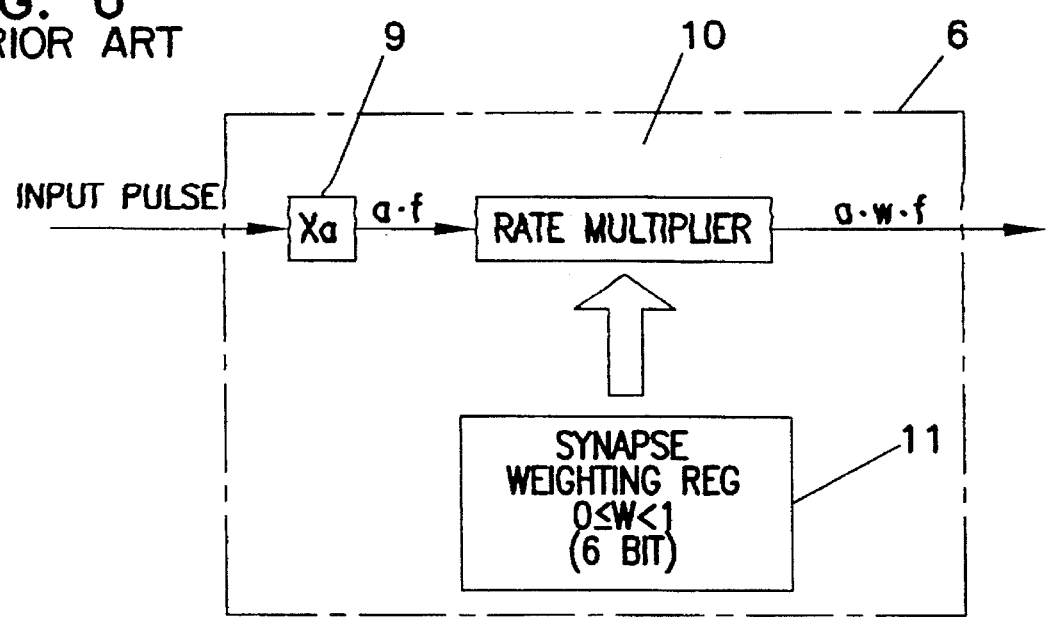
FIG. 6 is a part of the construction of FIG. 5.
Figure 7:
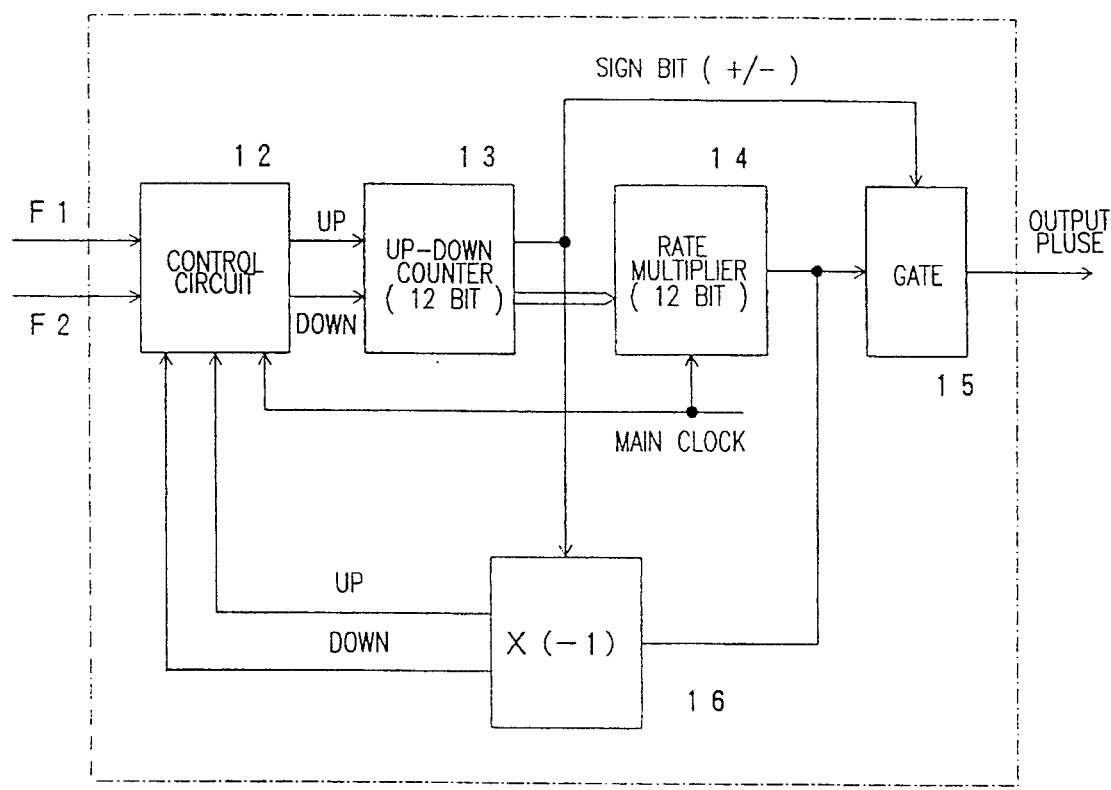
FIG. 7 is another part of the construction of FIG. 5.
Figure 9:
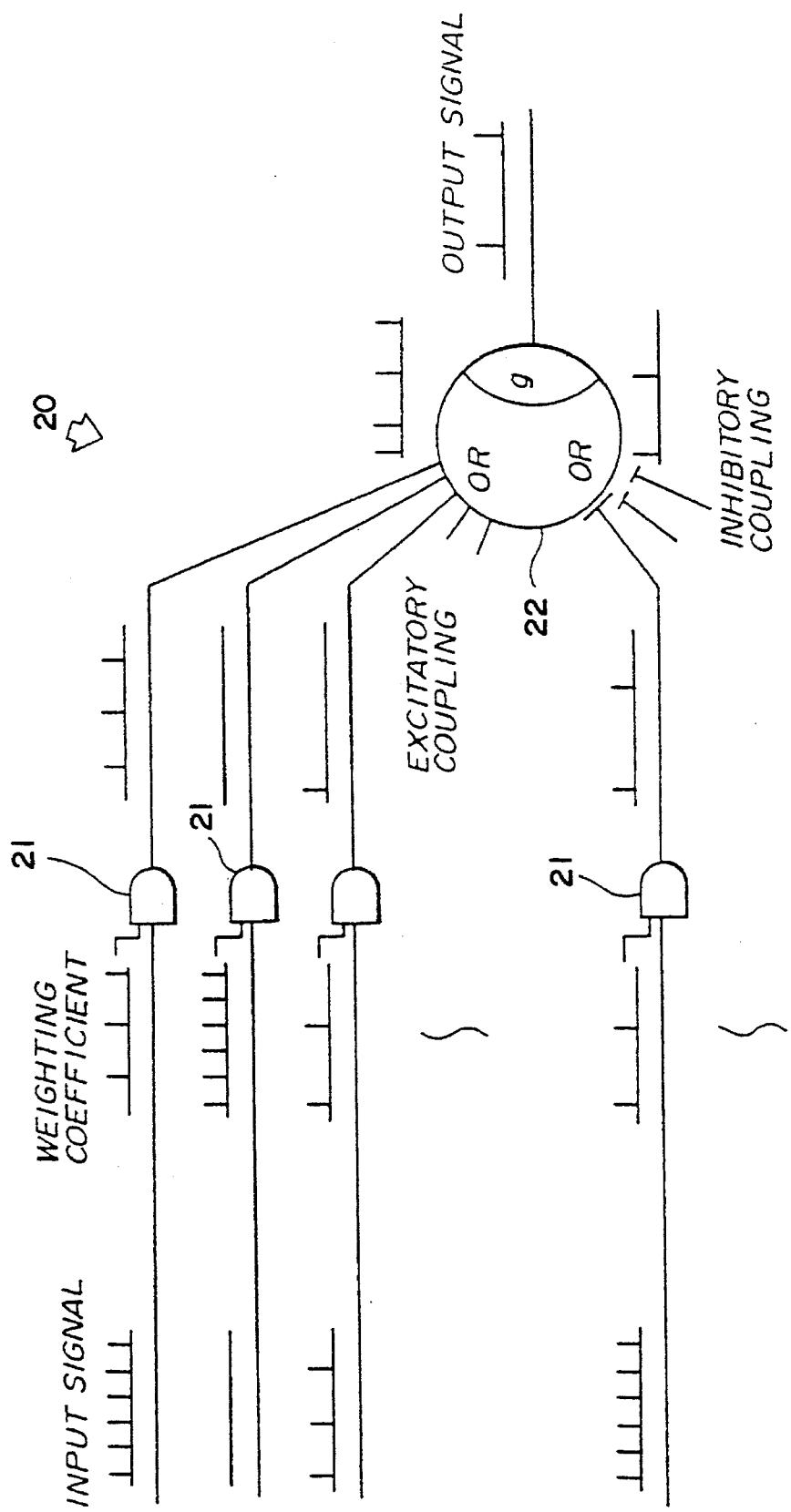
FIG. 9 is a logic circuit diagram of a circuit for effecting basic signal processings in the embodiment.
Figure 10:
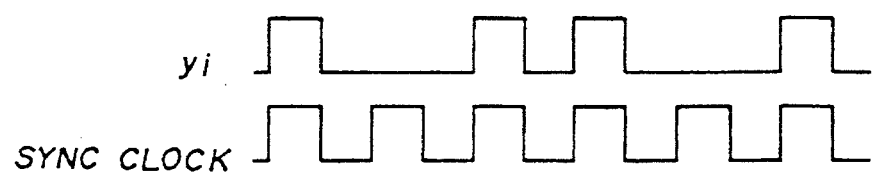
FIG. 10 is a timing chart showing an example of logic operation.

FIG. 9 shows a neuron unit 20, and a plurality of such neuron units 20 are connected in a plurality of layers to form a hierarchical neural network shown in FIG. 2, for example. The input and output signals of the neuron unit 20 are all described in binary by "1"s and "0"s and are synchronized. The signal intensity of the input signal $y_i$ is expressed by a pulse density, that is, a number of "1"s existing in a pulse train within a predetermined time. FIG. 10 shows a case where four "1"s and two "0"s of the input signal $y_i$ exist within the predetermined time amounting to six synchronizing pulses. In this case, the input signal $y_i$ has a signal intensity 4/6. A determination of "1" or "0" is made when the synchronizing pulse rises or falls. It is desirable that the "1"s and "0"s of the input signal $y_i$ are positioned at random within the predetermined time.

Figure 11:
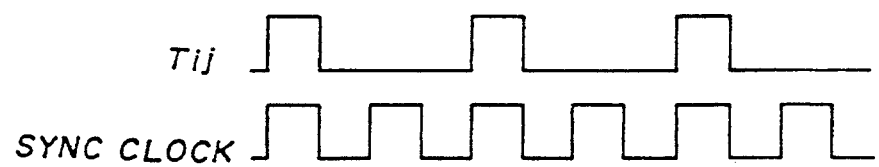
FIG. 11 is a timing chart showing an example of logic operation.

On the other hand, the weighting coefficient $T_{ij}$ is similarly described by a pulse density, and is stored in a memory as a pulse train of "0"s and three "0"s. FIG. 11 shows a case where three "1"s and three "0"s of the weight function $T_{ij}$ exist within the predetermined time amounting to six synchronizing pulses (101010). In this case, the weight function $T_{ij}$ has a value 3/6. As mentioned before, a determination of "1" or "0" is made when the synchronizing pulse rises or falls. It is desirable that the "1"s and "0"s of the weight function $T_{ij}$ are positioned at random within the predetermined time.

Figure 12:
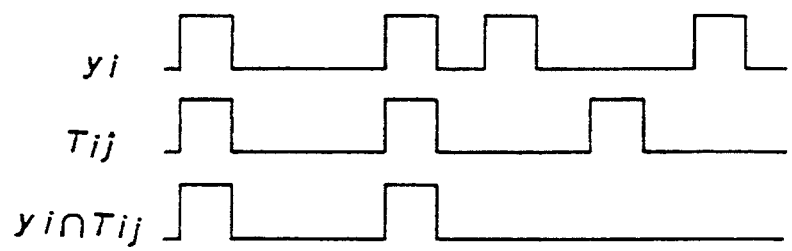
FIG. 12 is a timing chart showing an example of logic operation.

The pulse train of the weight function $T_{ij}$ is successively read from the memory responsive to the synchronizing pulses and supplied to each AND gate 21 shown in FIG. 9 which obtains a logical product $(y_i \cap T_{ij})$ with one pulse train of the input signal $y_i$. An output of the AND gate 21 is used as an input to the neuron unit 20. Hence, in the case described above, the logical product $y_i \cap T_{ij}$ in response to the input of "101101" becomes as shown in FIG. 12 and a pulse train "101000" is obtained. It can be seen from FIG. 12 that the input signal $y_i$ is converted by the weight function $T_{ij}$ and the pulse density becomes 2/6.

The pulse density of the output signal of the AND gate 21 is approximately the product of the pulse density of the input signal and the pulse density of the weight function, and the AND gate 21 acts similarly as in the case of the analog circuit. The pulse density of the output signal of the AND gate 21 more closely approximates the above product as the pulse train becomes longer and as the locations of the "1"s and the "0"s become more at random. When the pulse train of the weight function is short compared to the pulse train of the input signal and no further data can be read out from the memory, the data can be read out from the first data and repeat such an operation until the pulse train of the input signal ends.

Figure 13:
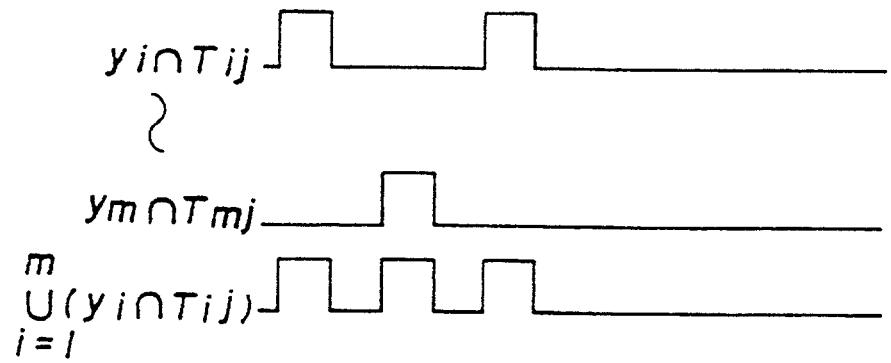
FIG. 13 is a timing chart showing an example of logic operation.

One neuron unit 20 receives a plurality of input signals, and a plurality of logical products are obtained between the input signal and the weight function. Hence, an OR circuit 22 obtains a logical sum of the logical products. Since the input signals are synchronized, the logical sum becomes "111000" when the first logical product is "101000" and the second logical product is "010000", for example FIG. 13 shows the logical products input to the OR circuit 22 and the logical sum $(y_i \cap T_{ij})$ which is output from the OR circuit 22. This corresponds to the calculation of the sum and the non-linear function (sigmoid function) in the case of the analog calculation.

When the pulse densities are low, the logical sum of such pulse densities is approximately the sum of the pulse densities. As the pulse densities become higher, the output of the OR circuit 22 saturates and no longer approximates the sum of the pulse densities, that is, the non-linear characteristic begins to show. In the case of the logical sum, the pulse density will not become greater than "1" and will not become smaller than "0". In addition, the logical sum displays a monotonous increase and is approximately the same as the sigmoid function.

As described above, there are two types of couplings (or weighting), namely, the excitatory coupling and the inhibitory coupling. When making numerical calculations, the excitatory and inhibitory couplings are described by positive and negative signs on the weight function. In the case of the analog neuron unit, when the weight function $T_{ij}$ indicates the inhibitory coupling and the sign on the weight function $T_{ij}$ is negative, an inverting amplifier is used to make an inversion and a coupling to another neuron unit is made via a resistance which corresponds to the weight function $T_{ij}$. On the other hand, in the case of the digital neuron network, the couplings are divided into an excitatory group and an inhibitory group depending on the positive and negative signs on the weight function $T_{ij}$. Then, an OR of the logical products of input signals and weight functions is calculated for each group. The result thus obtained for the excitatory group is designated as $F_j$ and the result for the inhibitory group is designated as $I_j$.

Alternatively, two types of weight functions may be provided for each input $y_j$, namely, the weight function $T_{ij(+)}$ indicating an excitatory coupling and the weight function $T_{ij(-)}$ indicating an inhibitory coupling. An input $y_i$ is ANDed with each of the weight functions $(y_i \cap T_{ij(+)}, y_i \cap T_{ij(-)})$. An OR is obtained for each type of weight function $(\cup(y_i \cap T_{ij(+)}), \cup(y_i \cap T_{ij(-)}))$. The result for the excitatory group is designated as $F_j$, and the result for the inhibitory group is designated as $I_j$.

To summarize the above,

1) When only one of the two types of weight function (excitatory or inhibitory) exist for a given input, the following equations (8) and (9) hold.

$$F_j = \bigcup_{i \in \text{excitatory}} (y_i \cap T_{ij}) \quad (T_{ij} = \text{excitatory}) \tag{8}$$

$$I_j = \bigcup_{i \in \text{inhibitory}} (y_i \cap T_{ij}) \quad (T_{ij} = \text{inhibitory}) \tag{9}$$

2) When both two types of weight function (excitatory and inhibitory) exist for a given input, the following equations (10), (11) or the equations (12), (13) hold.

$$F_j = \bigcup_{i=1}^{m} \{y_i \cap T_{ij(+)}\} \tag{10}$$

$$I_j = \bigcup_{i=1}^{m} \{y_i \cap T_{ij(-)}\} \tag{11}$$

$$F_j = \bigcup_{i=1}^{m} y_{Fij} \tag{12}$$

$$I_j = \bigcup_{i=1}^{m} y_{Iij} \tag{13}$$

When only one type of weight function (excitatory or inhibitory) exists for a given input, $y_{Fij}$ and $y_{Iij}$ of the equations (12) and (13) are described by the equations (14) and (15), respectively.

$$\begin{aligned} y_{Fij} &= y_i \cap T_{ij} \quad (T \in \text{excitatory}) \\ &= 0 \quad (T \in \text{inhibitory}) \end{aligned} \tag{14}$$

$$\begin{aligned} y_{Iij} &= y_i \cap T_{ij} \quad (T \in \text{inhibitory}) \\ &= 0 \quad (T \in \text{excitatory}) \end{aligned} \tag{15}$$

When both types of weight function (excitatory and inhibitory) exist for a given input, $y_{Fij}$ and $y_{Iij}$ are described as the equations (16) and (17) below.

$$y_{Fij} = y_i \cap T_{ij(+)} \tag{16}$$

$$y_{Iij} = y_i \cap T_{ij(-)} \tag{17}$$

If the result $F_j$ for the excitatory group and the result $I_j$ for the inhibitory group do not match, the result of the excitatory group is output. To be more specific, when the result $F_j$ for the excitatory group is "0" and the result $I_j$ for the inhibitory group is "1", "0" is output When the result $F_j$ of the excitatory group is "1" and the result $I_j$ for the inhibitory group is "0", "1" is output. When the result $F_j$ for the excitatory group and the result $I_j$ for the inhibitory group match, either "0" or "1" may be output. Alternatively, a second input signal $E_j$ provided separately may be output. Alternatively, a logical sum of the second input signal $E_j$ and the content of the memory provided in relation to the second input signal $E_j$ may be calculated and output. As is the case for the weight function for the input signal, the memory provided in relation to the second input signal $E_j$ may be used from the start when the totality of the content has been read.

Figure 14:
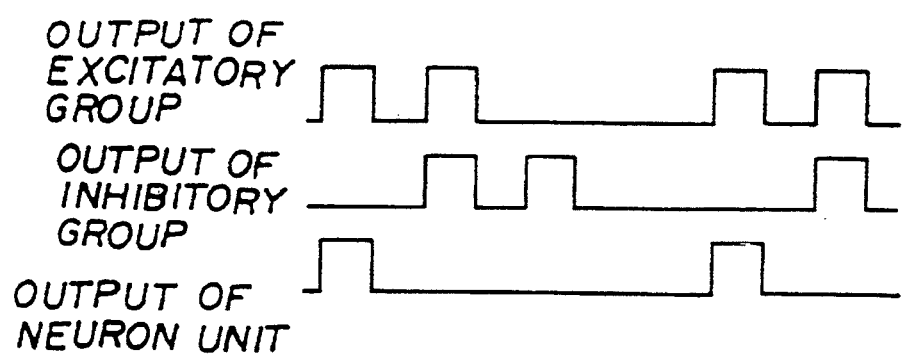
FIG. 14 is a timing chart showing an example of logic operation.

In order to realize this function in the case of outputting "0", an AND of the output of the excitatory group and a NOT of the output of the inhibitory group is obtained. FIG. 14 shows such an example, and its representation in the form of an equation is the equation (18).

$$y_j = F_j \cap \bar{I}_j \tag{18}$$

Figure 15:
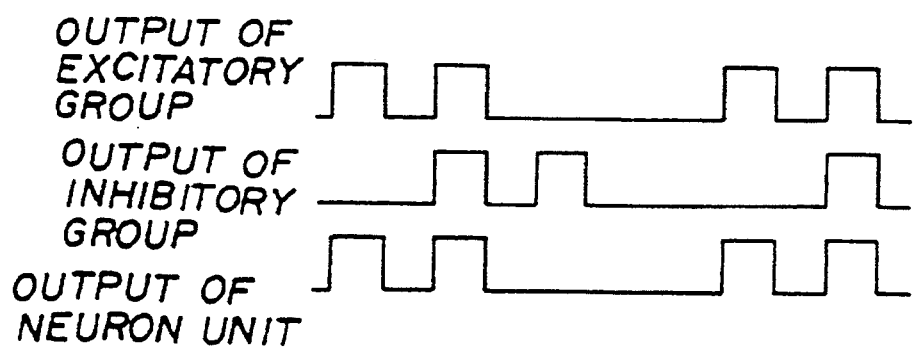
FIG. 15 is a timing chart showing an example of logic operation.

In the case of outputting "1", an OR of the output of the excitatory group and a NOT of the output of the inhibitory group is obtained. FIG. 15 shows such an example, and its representation in the form of an equation is the equation (19).

$$y_j = F_j \cup \bar{I}_j \tag{19}$$

Figure 16:
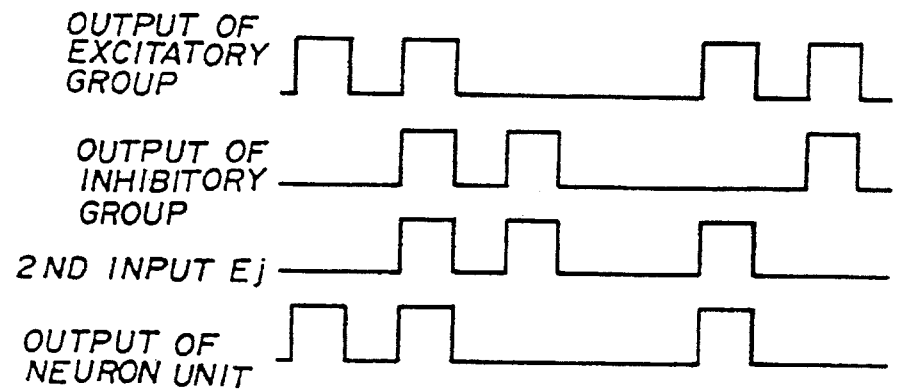
FIG. 16 is a timing chart showing an example of logic operation.

FIG. 16 shows a case in which a second input signal is output. Its representation in the form of an equation is the equation (20).

$$y_j = ((F_j \text{ XOR } I_j) \text{ AND } F_j) \text{ OR } \{(\overline{F_j \text{ XOR } I_j}) \text{ AND } E_j\} \tag{20}$$

Figure 17:
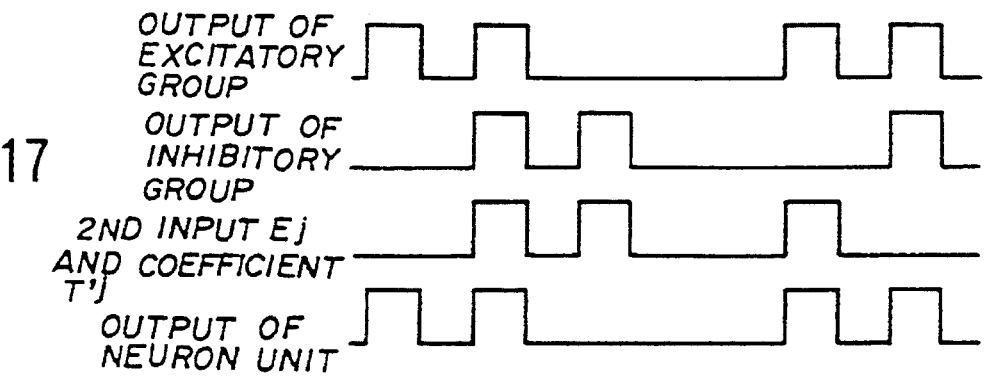
FIG. 17 is a timing chart showing an example of logic operation.

According to a fourth method, the content in relation to the input signal $E_j$ is designated as $T'_j$. FIG. 17 shows such a case, and its representation in the form of an equation is the equation (21).

$$y_j = \{(F_j \text{ XOR } I_j) \text{ AND } F_j) \text{ OR } ((\overline{F_j \text{ XOR } I_j}) \text{ AND } (E_j \text{ AND } T'j)\} \tag{21}$$

The neural network can be formed by connecting a plurality of such neuron units 20 in a plurality of layers to form a hierarchical structure similarly as in the case of the neural network shown in FIG. 2. When the entire neural network is synchronized, it is possible to carry out the above described calculation in each layer.

The internal potential $u_j$ as defined in the equation (1) is calculated by the following equation (22).

$$u_j = \Sigma(\text{pulse density of } y_{Fij}) - \Sigma(\text{pulse density of } y_{Iij}) \tag{22}$$

Signal calculation processings in a learning process will be described.

Basically, after a differential coefficient of the output signal is obtained in accordance with the following description (a), an error signal is obtained in accordance with the description (b) and (c). Thereafter, the method described in the description (d) is utilized to modify the value of the coefficient.

(a) Differential coefficient of the output signal

Figure 18:
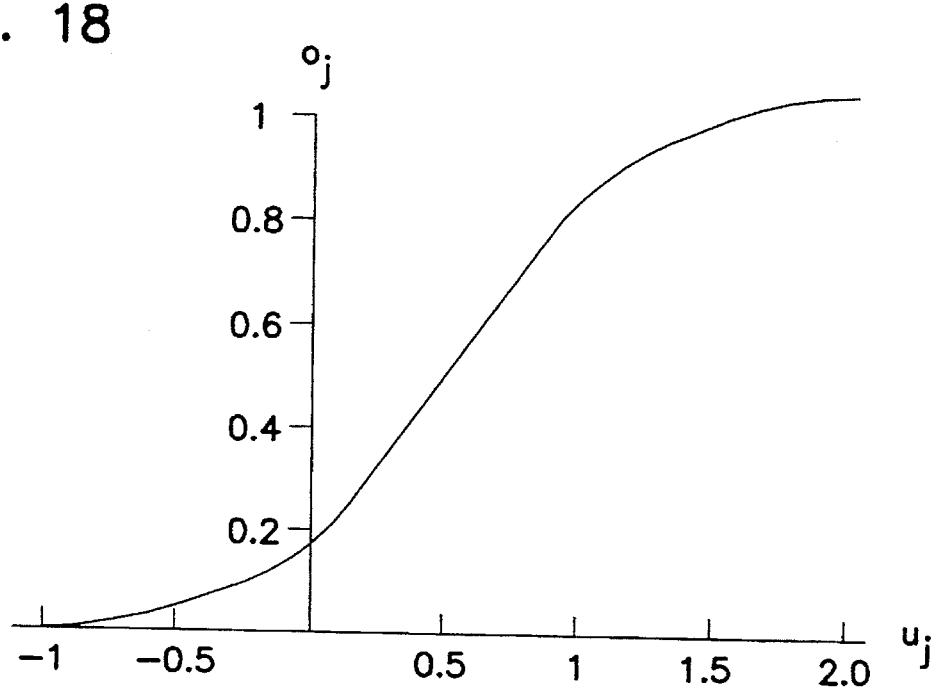
FIG. 18 is a graph showing the characteristic of a response function.

In order to calculate an error signal used in a learning process, a differential coefficient (a differential coefficient of a neuron response function) which is a differential of the output signal with respect to the internal potential is required. An example of the response function is shown in FIG. 18 wherein the relationship between the output signal (see the equation (18)) obtained in response to two inputs and the internal potential (see the equation (22)) is shown. Although no one-to-one correspondence between these two values exists, FIG. 18 shows average values. A differential of such a response function is as indicated by the characteristic curve A of FIG. 19. The differential coefficient of this response function is given approximately by the following equation (23), wherein $O_j$ denotes the pulse density of the output signal, and $O_j'$ denotes the differential coefficient thereof.

$$O_j' = O_j(1 - O_j) \tag{23}$$

Figure 19:
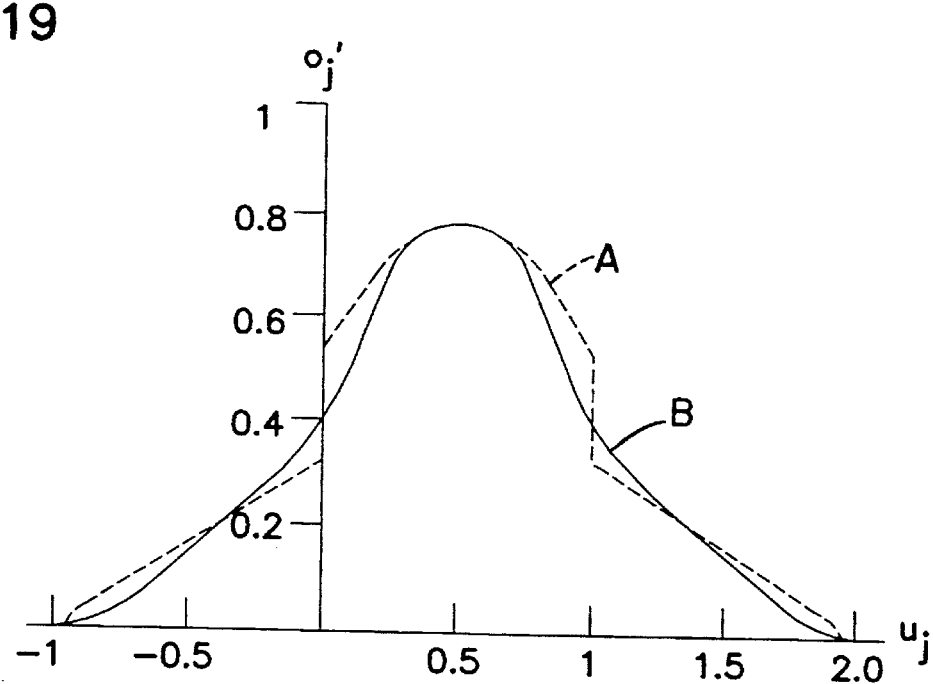
FIG. 19 is a graph showing the characteristic of the differential of the response function.

The differential coefficient is as indicated by the characteristic curve of FIG. 19, showing that the equation (23) is a good approximation.

The same result will be obtained when the output signal is given by the equation (19), (20) or (21) and not by the equation (18).

The following measures are taken in order to embody the equation (23) in the form of operations on pulse trains. First, $O_j$ is represented by $y_j$, $(1-O_j)$ is represented by a NOT of $y_j$, and the product is represented by a logical operation AND. Specifically, given that the signal indicating the differential coefficient is $f_j'$, the equation (24) is obtained.

$$f_j' = y_j \cap \bar{y}_j \tag{24}$$

In an unmodified form, the equation (24) always returns a result of "0". Hence, a delaying process is applied on either "$y_j$" or "NOT of $y_j$" so as to make sure that "0" is not always returned. When the delayed signal is represented as "dly'd", either the equation (25) or the equation (26) will be utilized.

$$f_{j(+)}' = y_{dly'd_j} \cap \bar{y}_j \tag{25}$$

$$f_{j(-)}' = \overline{y_{dly'd_j}} \cap y_j \tag{26}$$

The use of these two equations will be described later. The delaying process can be easily realized by a register. The amount of delay may correspond to a single clock or a plurality of clocks.

(b) Error signal in the final layer

Figure 20:
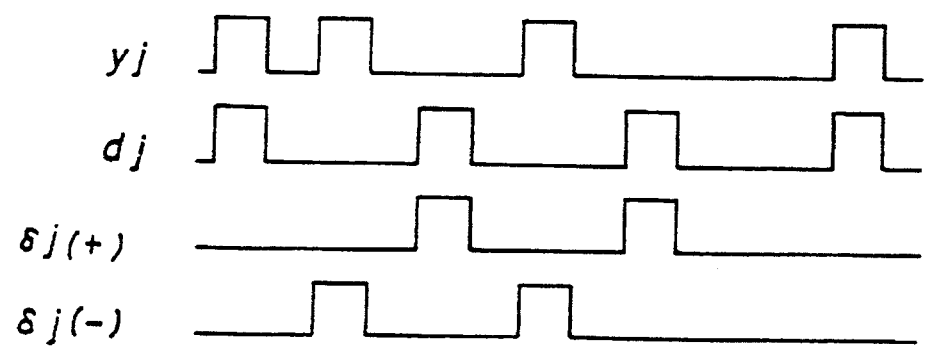
FIG. 20 is a timing chart showing an example of logic operation.

An error signal is calculated for each neuron in the final layer. On the basis of the error signal thus obtained, the weight function associated with each of the neurons is modified. A description will now be given of how the error signal is calculated. An error signal is defined as follows. That is, the error may take a positive or negative value when the error is described by a numerical value, but in the case of the pulse density, it is impossible to simultaneously describe the positive and negative values. Hence, two kinds of signals, namely, a signal which indicates a positive component and a signal which indicates a negative component are used to describe the error signal. Error signals of the jth neuron unit 20 are illustrated in FIG. 20. The positive component of the error signal is obtained by ANDing the pulses existing on the teaching signal side out of the part (1, 0) and (0, 1), where the teaching signal pulse and the output signal pulse differ, and the differential coefficient. Similarly, the negative component of the error signal is obtained by ANDing the pulses existing on the output signal side out of the parts (1, 0) and (0, 1), where the teaching signal pulse and the output signal pulse differ, and the differential coefficient. The positive and negative error signals $\delta_{j(+)}$ and $\delta_{j(-)}$ in their logical representation are the equations (27) and (28). The equations (25) and (26) are used to calculate the differential coefficient in the equations (27) and (28), respectively.

$$\delta_{j(+)} = \bar{y}_j \cap d_j \cap f_{j(+)}' \tag{27}$$

$$\delta_{j(-)} = y_j \cap \bar{d}_j \cap f_{j(-)}' \tag{28}$$

Supposing that a reversal in the above combination has occurred (that is, if the coefficient calculated according to the equation (26) is applied to the equation (27), and the coefficient calculated according to the equation (25) is applied to the equation (28)), the result returned by the equations (27) and (28) always becomes "0", thus rendering the neural network ineffective. Hence, the utilization of both kinds of differential coefficient indicated by the equations (25) and (26) is necessary.

As will be described later, the weight function is varied based on such error signal pulses.

(c) Error signal in the intermediate layer

The error signal is back propagated, so that not only the weight functions of the final layer and the immediately preceding layer but also the weight function of the layer which precedes the above immediately preceding layer are varied. For this reason, there is a need to calculate the error signal for each neuron unit 20 in the intermediate layer. The error signal from each of the neuron units 20 in the next layer are collected and used as the error signal of a certain neuron unit 20 of the intermediately layer, substantially in the reverse manner as supplying the output signal of the certain neuron unit 20 to each of the neuron units in the next layer. This may be achieved similarly as described above with reference to the equations (8)–(10) and FIGS. 10 through 15, which equations and figures were referenced as applicable to a neuron. That is, the couplings are divided into two groups depending on whether the coupling is an excitatory coupling or an inhibitory coupling, and the multiplication part is described by AND and the Σ part is described by OR. The only difference from the case of a neuron is that although $y_j$ is a single signal $\delta_j$ may be positive or negative and thus two error signals must be considered. Therefore, four cases must be considered depending on whether the weight function $T_{ij}$ is positive or negative and whether the error signal $\delta_j$ is positive or negative.

Figure 21:
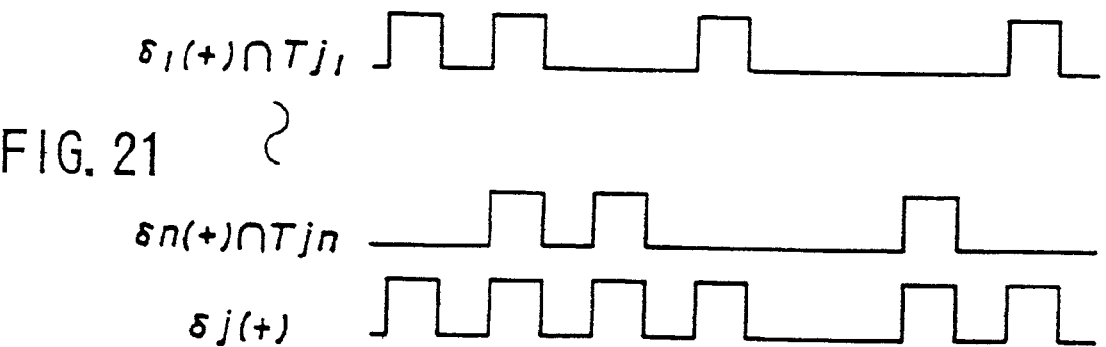
FIG. 21 is a timing chart showing an example of logic operation.
Figure 22:
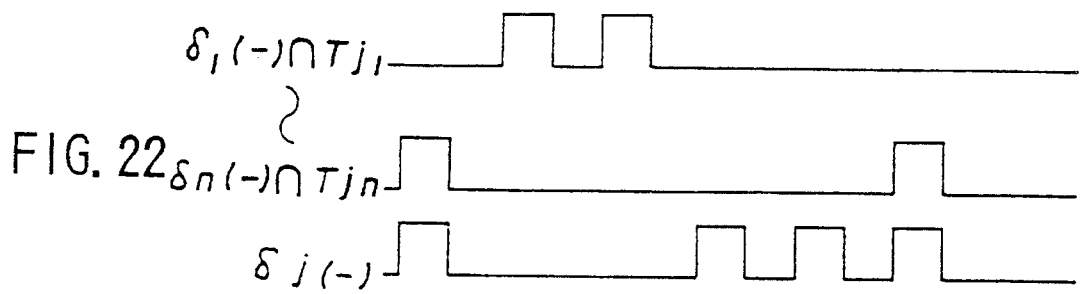
FIG. 22 is a timing chart showing an example of logic operation.

First, a description will be given of the excitatory coupling. In this case, $(\delta_{k(+)} \cap T_{jk})$ which is an AND of the positive error signal $\delta_{k(+)}$ of the kth neuron unit in the layer next to a specific layer and the weight function $T_{jk}$ between the jth neuron unit in the specific layer and the kth neuron unit in the next layer is obtained for each neuron unit in the specific layer. Furthermore, $(\cup(\delta_{k(+)} \cap T_{jk})$ which is an OR of the ANDded results obtained for each neuron unit in the specific layer, and this OR is regarded as the positive error signal $\delta_{j(+)}$ for the specific layer. That is, given that there are a total of n neurons in the next layer, FIG. 21 shows the case of the excitatory coupling. This is represented by the equation (29).

$$\int \begin{matrix} \delta_{1(+)} \cap T_{j1} \equiv E_{j1(+)} \\ \delta_{n(+)} \cap T_{jn} \equiv E_{jn(+)} \end{matrix} \tag{29}$$

$$\bigcup_{k=1}^{n} (\delta_{k(+)} \cap T_{jk}) \equiv \delta_{j(+)} \left( = \bigcup_{k=1}^{n} E_{jk(+)} \right)$$

Similarly, an AND of the error signal $\delta_{k(-)}$ of the kth neuron unit in the next layer and the weight function $T_{jk}$ between the jth neuron unit in the specific layer and the kth neuron unit in the next layer is obtained for each neuron unit in the specific layer. Furthermore, an OR of the ANDded results is obtained for each neuron in the specific layer, and this OR is regarded as the negative error signal $\delta_{j(-)}$ for the specific layer as shown FIG. 22. This is represented by the equation (30).

$$\frac{\int \begin{array}{c} \delta_{1(-)} \cap T_{j1} \equiv E_{j1(-)} \\ \delta_{n(-)} \cap T_{jn} \equiv E_{jn(-)} \end{array}}{\bigcup_{k=1}^{n} (\delta_{k(-)} \cap T_{jk}) \equiv \delta_{j(-)} \left( = \bigcup_{k=1}^{n} E_{jk(-)} \right)} \quad (30)$$

Figure 23:
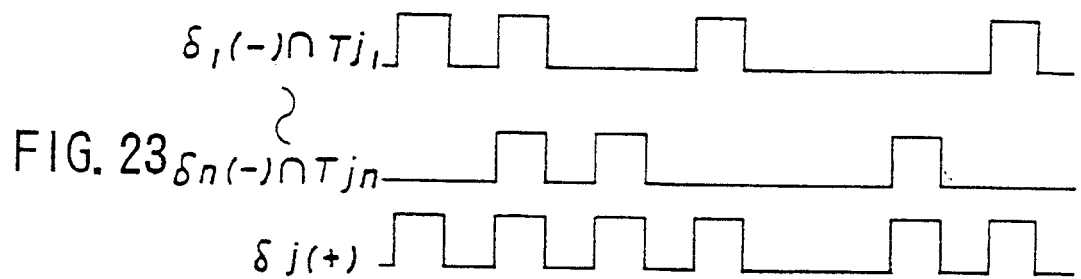
FIG. 23 is a timing chart showing an example of logic operation.

Next, a description will be given of the inhibitory coupling. In this case, an AND of the negative error signal $\delta_{k(-)}$ of the kth neuron unit in the layer next to a specific layer and the weight function $T_{jk}$ between the jth neuron unit in the specific layer and the kth neuron unit in the next layer is obtained for each neuron unit in the specific layer. Furthermore, an OR of the ANDed results is obtained for each neuron unit in the specific layer, and this OR is regarded as the positive error signal $\delta_{j(+)}$ for the specific layer as shown in FIG. 23. This is represented by the equation (31).

$$\frac{\int \begin{array}{c} \delta_{1(-)} \cap T_{j1} \equiv E_{j1(+)} \\ \delta_{n(-)} \cap T_{jn} \equiv E_{jn(+)} \end{array}}{\bigcup_{k=1}^{n} (\delta_{k(-)} \cap T_{jk}) \equiv \delta_{j(+)} \left( = \bigcup_{k=1}^{n} E_{jk(+)} \right)} \quad (31)$$

Figure 24:
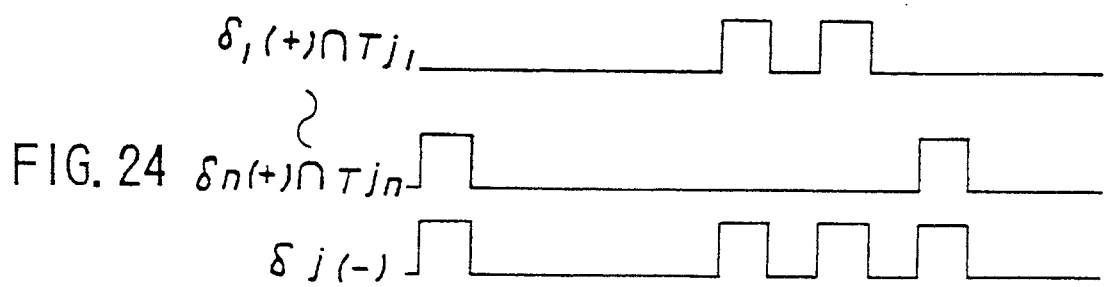
FIG. 24 is a timing chart showing an example of logic operation.

In addition, an AND of the positive error signal $\delta_{k(+)}$ of the kth neuron unit in the next layer and the weight function $T_{jk}$ between the jth neuron unit in the specific layer and the kth neuron unit in the next layer is obtained for each neuron unit in the specific layer. Furthermore, an OR of the ANDed results is obtained for each neuron unit in the specific layer, and this OR is regarded as the negative error signal $\delta_{j(-)}$ for the specific layer as shown in FIG. 24. This is represented by the equation (32).

$$\frac{\int \begin{array}{c} \delta_{1(+)} \cap T_{j1} \equiv E_{j1(-)} \\ \delta_{n(+)} \cap T_{jn} \equiv E_{jn(-)} \end{array}}{\bigcup_{k=1}^{n} (\delta_{k(+)} \cap T_{jk}) \equiv \delta_{j(-)} \left( = \bigcup_{k=1}^{n} E_{jk(-)} \right)} \quad (32)$$

One neuron unit may be coupled to another neuron unit by an excitatory or inhibitory coupling, an OR of the error signal $\delta_{j(+)}$ shown in FIG. 21 and the error signal $\delta_{(+)}$ shown in FIG. 23 is obtained. Finally, this OR signal and the differential coefficient is ANDded, and the result is regarded as the error signal $\delta_{j(+)}$ of the jth neuron unit. Similarly, an OR of the error signal $\delta_{j(+)}$ shown in FIG. 22 and the error signal $\delta_{j(-)}$ shown in FIG. 24 is obtained. This OR signal and the differential coefficient is ANDded, and the result is regarded as the error signal $\delta_{j(-)}$ of the jth neuron unit.

Therefore, the error signals of the jth neuron unit in the specific layer can be described by the following equations (33) and (34).

$$\delta_{j(+)} = \quad (33)$$

$$\left( \bigcup_{k \in \text{excitatory}} (\delta_{k(+)} \cap T_{jk}) \right) \cup \left( \bigcup_{k \in \text{inhibitory}} (\delta_{k(-)} \cap T_{jk}) \right) \cap f_{j(+)}'$$

$$\delta_{j(-)} =$$

$$\left( \bigcup_{k \in \text{excitatory}} (\delta_{k(-)} \cap T_{jk}) \right) \cup \left( \bigcup_{k \in \text{inhibitory}} (\delta_{k(+)} \cap T_{jk}) \right) \cap f_{j(-)}'$$

$$\delta_{j(+)} = \cup E_{jk(+)} \cap f_{j(+)}'$$

$$\delta_{j(-)} = \cup E_{jk(-)} \cap f_{j(-)}'$$

where $$\begin{aligned} E_{jk(+)} &= \delta_{k(+)} \cap T_{jk} \; (T_{jk} = \text{excitatory}) \\ &= \delta_{k(-)} \cap T_{jk} \; (T_{jk} = \text{inhibitory}) \\ E_{jk(-)} &= \delta_{k(-)} \cap T_{jk} \; (T_{jk} = \text{excitatory}) \\ &= \delta_{k(+)} \cap T_{jk} \; (T_{jk} = \text{inhibitory}) \end{aligned} \quad (34)$$

The error signals are given by the following equations (35) and (36) if both the excitatory weight function and the inhibitory weight function exist for an input.

$$\delta_{j(+)} = \left( \bigcup_{k=1}^{n} (\delta_{k(+)} \cap T_{jk(+)}) \right) \cup \left( \bigcup_{k=1}^{n} (\delta_{k(-)} \cap T_{jk(-)}) \right) \cap f_{j(+)}' \quad (35)$$

$$\delta_{j(-)} = \left( \bigcup_{k=1}^{n} (\delta_{k(+)} \cap T_{jk(-)}) \right) \cup \left( \bigcup_{k=1}^{n} (\delta_{k(-)} \cap T_{jk(+)}) \right) \cap f_{j(-)}'$$

$$\delta_{j(+)} = \cup E_{jk(+)} \cap f_{j(+)}'$$

$$\delta_{j(-)} = \cup E_{jk(-)} \cap f_{j(-)}'$$

where $$\begin{aligned} E_{jk(+)} &= (\delta_{k(+)} \cap T_{jk(+)}) \cup (\delta_{k(-)} \cap T_{jk(-)}) \\ E_{jk(-)} &= (\delta_{k(-)} \cap T_{jk(+)}) \cup (\delta_{k(+)} \cap T_{jk(-)}) \end{aligned} \quad (36)$$

Figure 25:
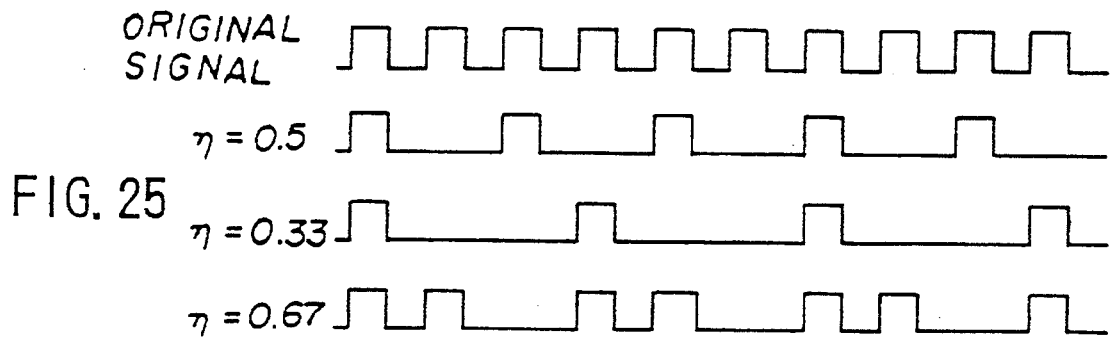
FIG. 25 is a timing chart showing an example of logic operation.
Figure 26:
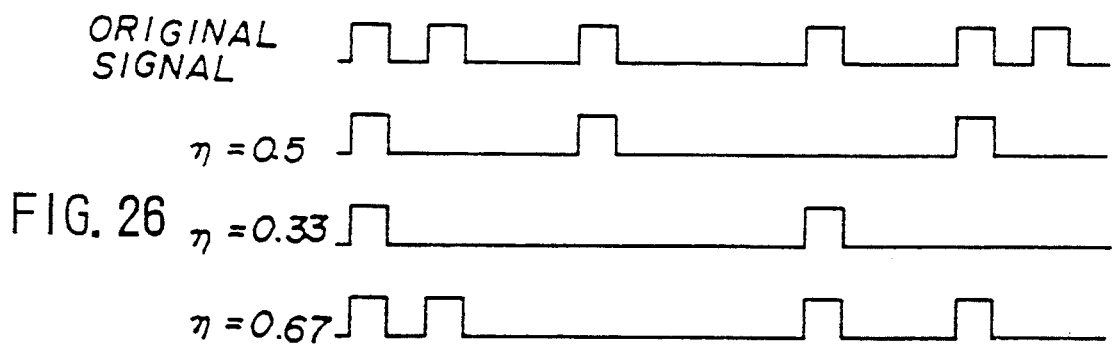
FIG. 26 is a timing chart showing an example of logic operation.
Figure 27:
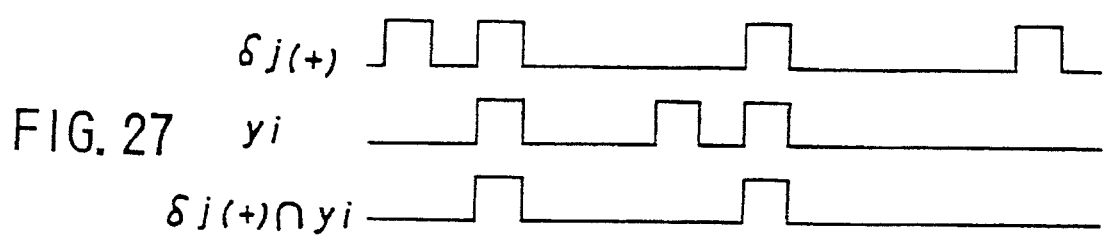
FIG. 27 is a timing chart showing an example of logic operation.
Figure 28:
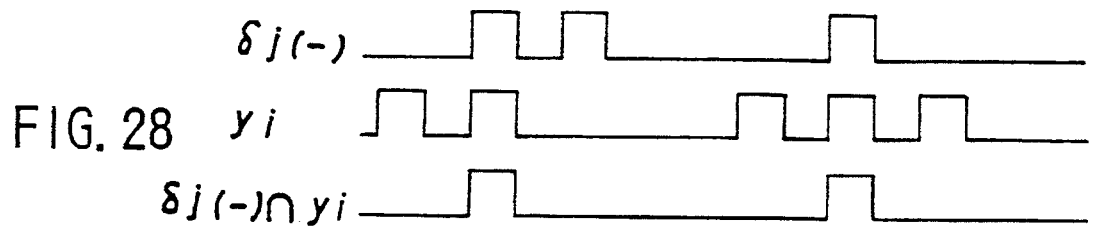
FIG. 28 is a timing chart showing an example of logic operation.

It is possible to further provide a function corresponding to the learning rate (learning constant). When the rate is "1" or less in numerical calculation, the learning capability is improved. This may be realized by thinning out the pulse train in the case of an operation on pulse trains. Given a learning rate $\eta = 0.5$, every other pulses of the original pulse signal are thinned out either in the case of the pulse signal in which the pulses are equi-distance from each other or in the case of the pulse signal in which the pulses are not equi-distant from each other. Referring to FIGS. 25 and 26, when $\eta = 0.5$, every other pulses are thinned out as stated above; when $= 0.33$, every third pulses of the original pulse signal are retained; and when $\eta = 0.67$, every third pulse of the original pulse signal is thinned out.

d. Variation of each weighting coefficient by the error signal

An AND is obtained between the error signal and the signal flowing in a line (see FIG. 2) to which the weight function which is to be varied belongs ($\delta_j \cap y_i$). But, since there are two error signals, one positive and one negative, both are obtained as shown respectively in FIGS. 27 and 28. The two signals which are obtained from the operations $\delta_{j(+)} \cap y_i$ and $\delta_{j(-)} \cap y_i$ are respectively designated as positive and negative weight function variation signals.

Figure 29:
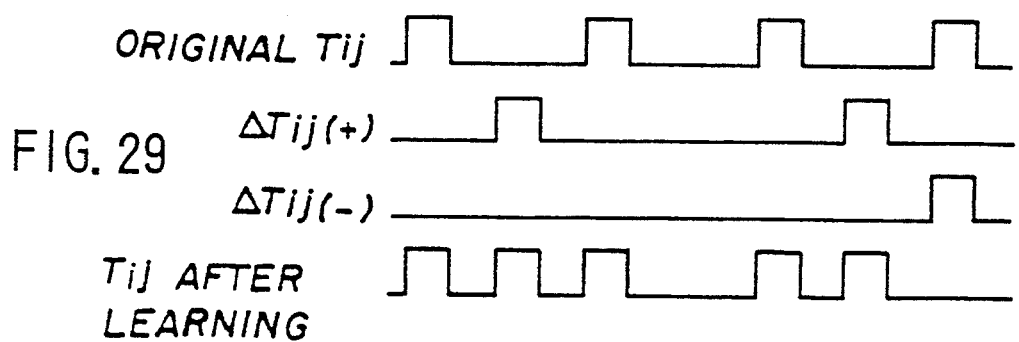
FIG. 29 is a timing chart showing an example of logic operation.
Figure 30:
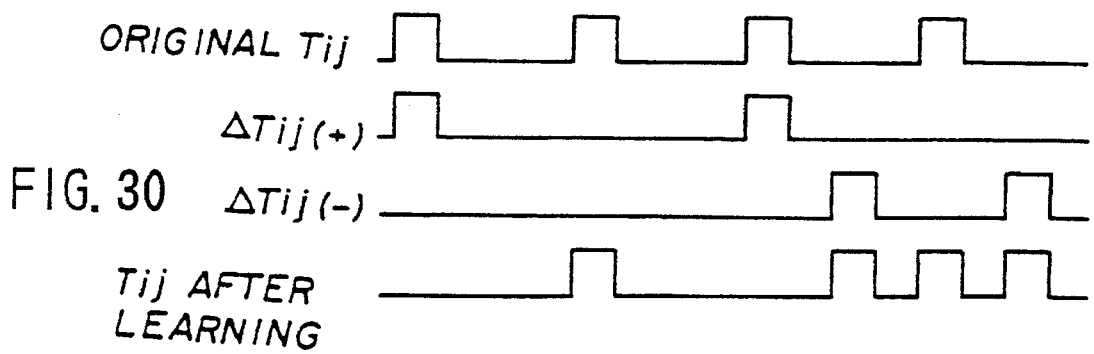
FIG. 30 is a timing chart showing an example of logic operation.

The two signals thus obtained are denoted by $\Delta T_{ij(+)}$ and $T_{ij(-)}$. Next, a new weight function $T_{ij}$ is obtained based on $\Delta T_{ij}$. But since the weight function $T_{ij}$ in this embodiment is an absolute value component, the new weight function is obtained differently depending on whether the original weight function $T_{ij}$ is excitatory or inhibitory. When the original weight function $T_{ij}$ is excitatory, the component of $\Delta T_{ij(+)}$ is increased with respect to the original weight function $T_{ij}$ and the component of $\Delta_{ij(-)}$ is decreased with respect to the original weight function $T_{ij}$ as shown in FIG. 29. On the other hand, when the original weight function $T_{ij}$ is inhibitory, the component of $\Delta_{ij}(+)$ is decreased with respect to the original weight function $T_{ij}$ and the component of $\Delta T_{ij(-)}$ is increased with respect to the original weight function $T_{ij}$ as shown in FIG. 30. The following equations (37) and (38) represent the content of FIGS. 29 and 30.

$$\Delta T_{ij(+)} = \delta_{j(+)} \cap \overline{\delta_{j(-)}} \cap y_j \quad (37)$$

$$\Delta T_{ij(-)} = \overline{\delta_{j(+)}} \cap \delta_{j(-)} \cap y_j \quad (38)$$

The calculations in the neural network are carried out based on the above described learning rule.

Figure 8:
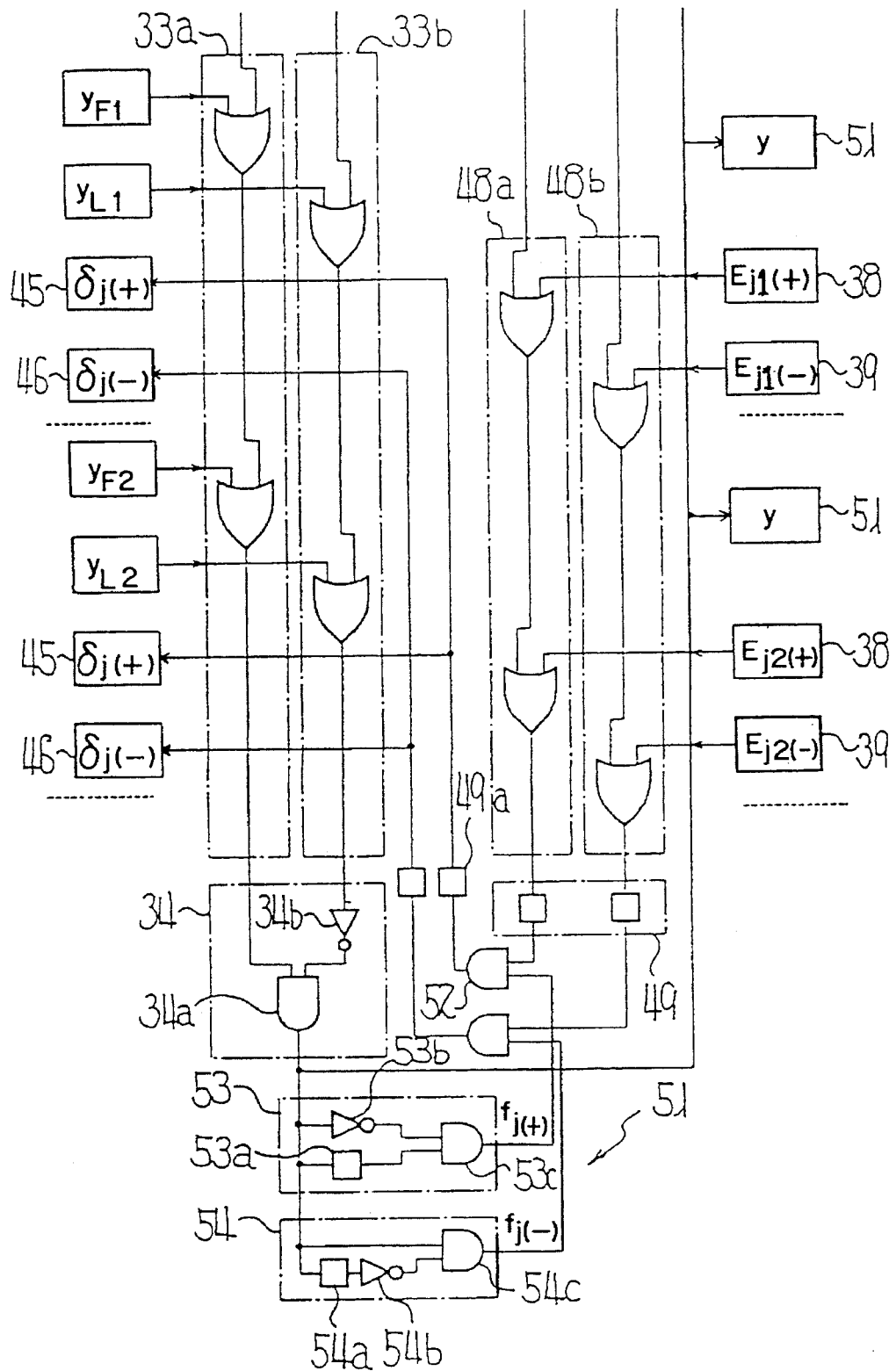
FIG. 8 is a logic circuit diagram showing a first embodiment described in claims 1 through 4.
Figure 33:
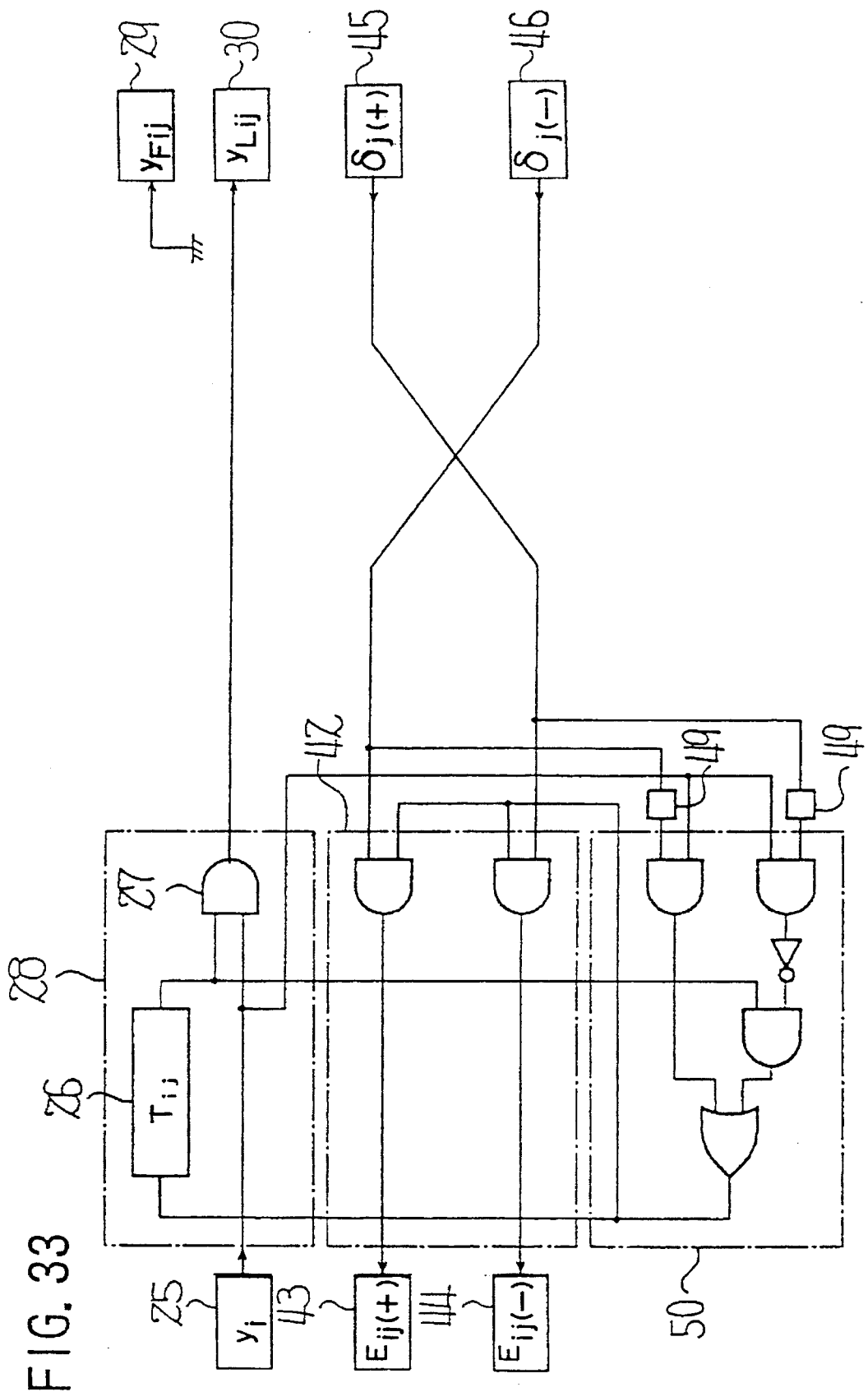
FIG. 33 is a logic circuit diagram showing a part of the construction of the first embodiment.
Figure 34:
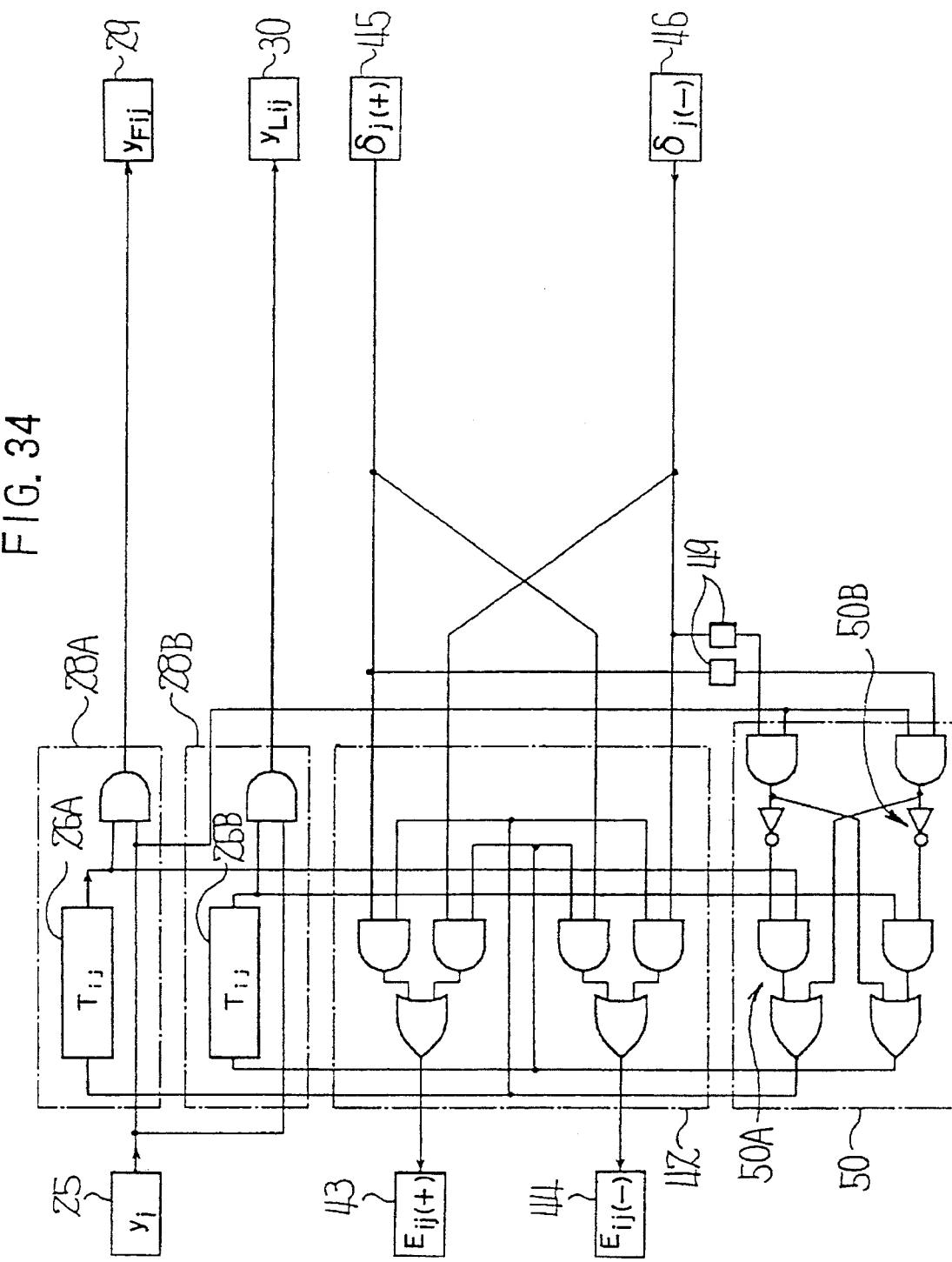
FIG. 34 is a logic circuit diagram showing a part of the construction of the first embodiment.
Figure 35:
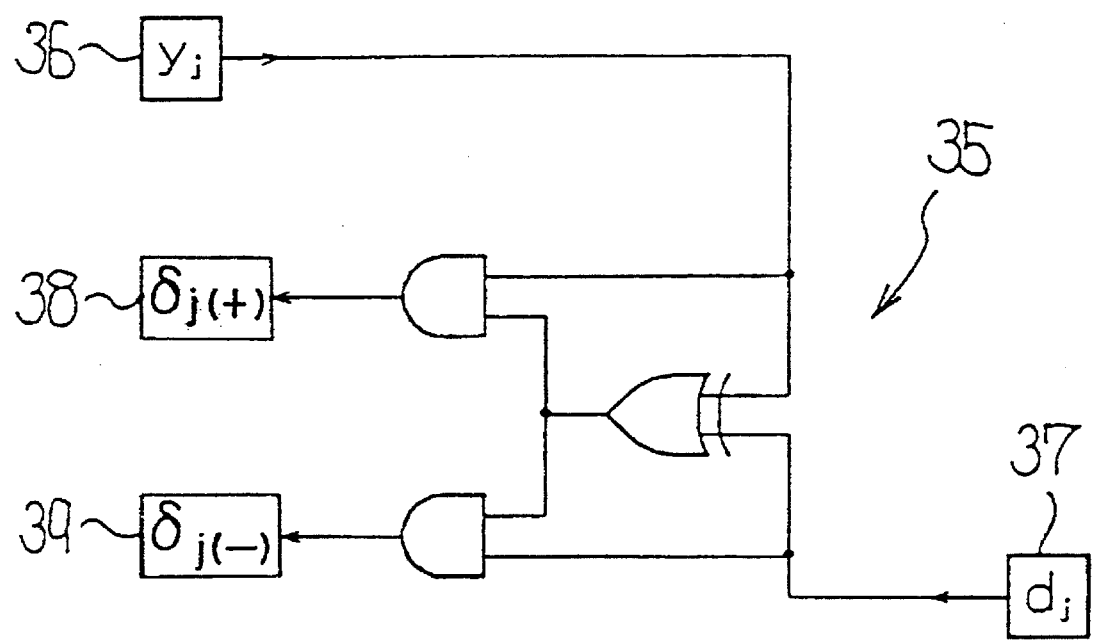
FIG. 35 is a logic circuit diagram showing a part of the construction of the first embodiment.

Next, a description will be given of actual circuits based on the above described algorithm. FIG. 8 and FIGS. 31 through 35 show such circuits, and the construction of the entire network is the same as that shown in FIG. 2. FIGS. 31 through 34 show circuits which correspond to a connection line (synapse) between two neuron units in the neural network as shown in FIG. 2. FIG. 8 shows a circuit which corresponds to a circle in FIG. 2 (the neuron 20). FIG. 35 shows a circuit for obtaining the error signal in the final layer based on the output of the final layer and the teaching signal. By connecting the three types of circuits shown respectively in FIG. 8, FIG. 31 through 34 and FIG. 35, the digital neural network having the self-learning function is formed.

Figure 31:
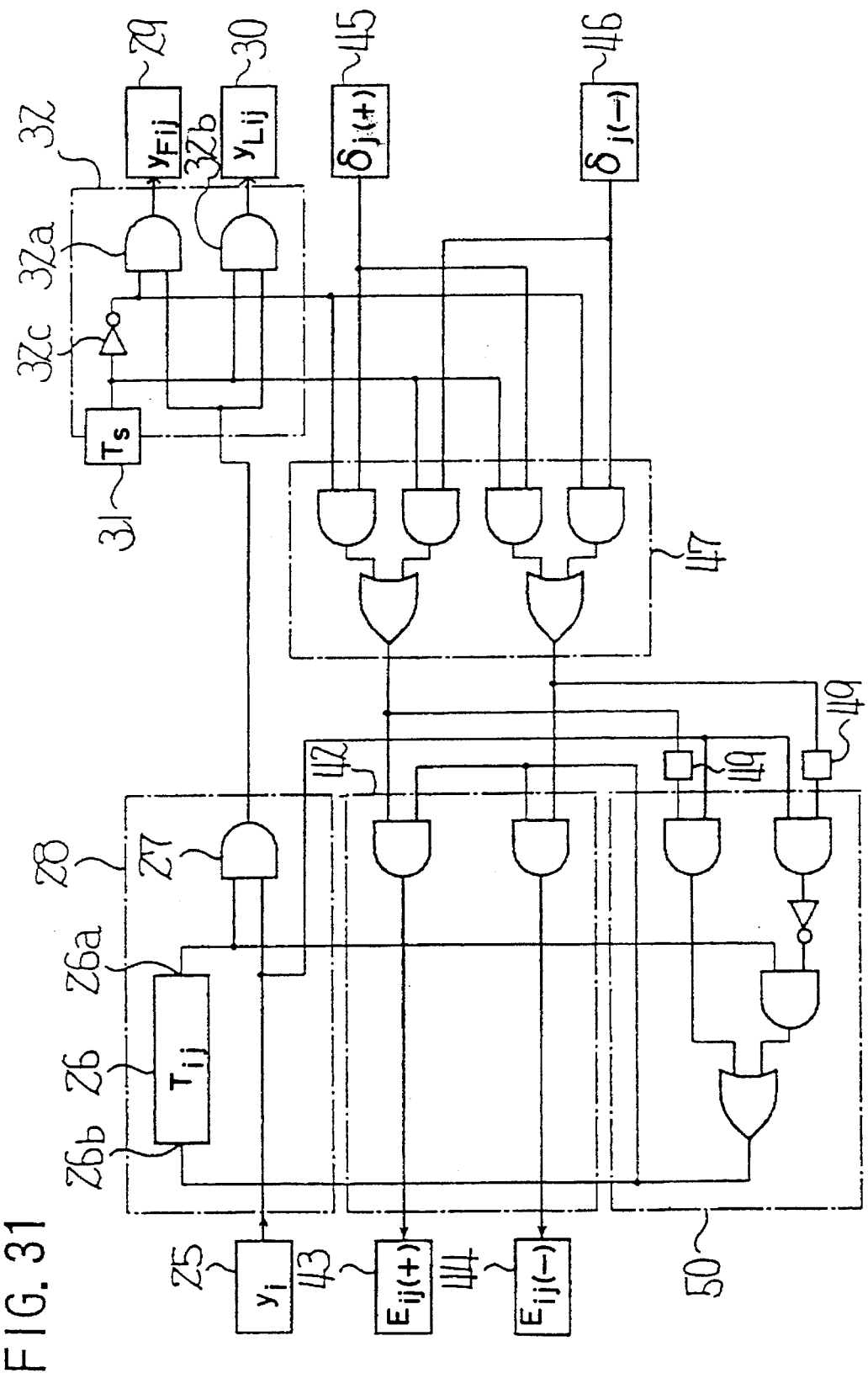
FIG. 31 is a logic circuit diagram showing a part of the construction of the first embodiment.

First, a description will be given with reference to FIG. 31. In FIG. 31, 25 indicates an input signal to a neuron as shown in FIG. 10. The value of the weight function described with reference to FIG. 12 is stored in a shift register 26. The shift register 26 has an input 26b and an output 26a and has a function similar to a general shift register. For example, a combination of a random access memory (RAM) and an address controller may be used as the shift register 26. A logic circuit 28 which includes an AND gate 27 and performs the function indicated in FIG. 13 obtains an AND of the input signal 25 and the weight function stored in the shift register 26. An output of the logic circuit 28 must be grouped depending on whether the coupling is excitatory or inhibitory, but it is preferable from the point of general application to prepare an output 29 for the excitatory group and an output 30 for the inhibitory group and output one of these outputs 29 and 30. For this reason, this embodiment has a memory 31 for storing a bit which indicates whether the coupling is excitatory or inhibitory, and a switching gate circuit 32 is switched depending on the bit which is stored in the memory 31. The switching gate circuit 32 includes two AND gates 32a and 32b and an inverter 32c which inverts the bit which is read out from the memory 31 and is supplied to the AND gate 32a.

Figure 32:
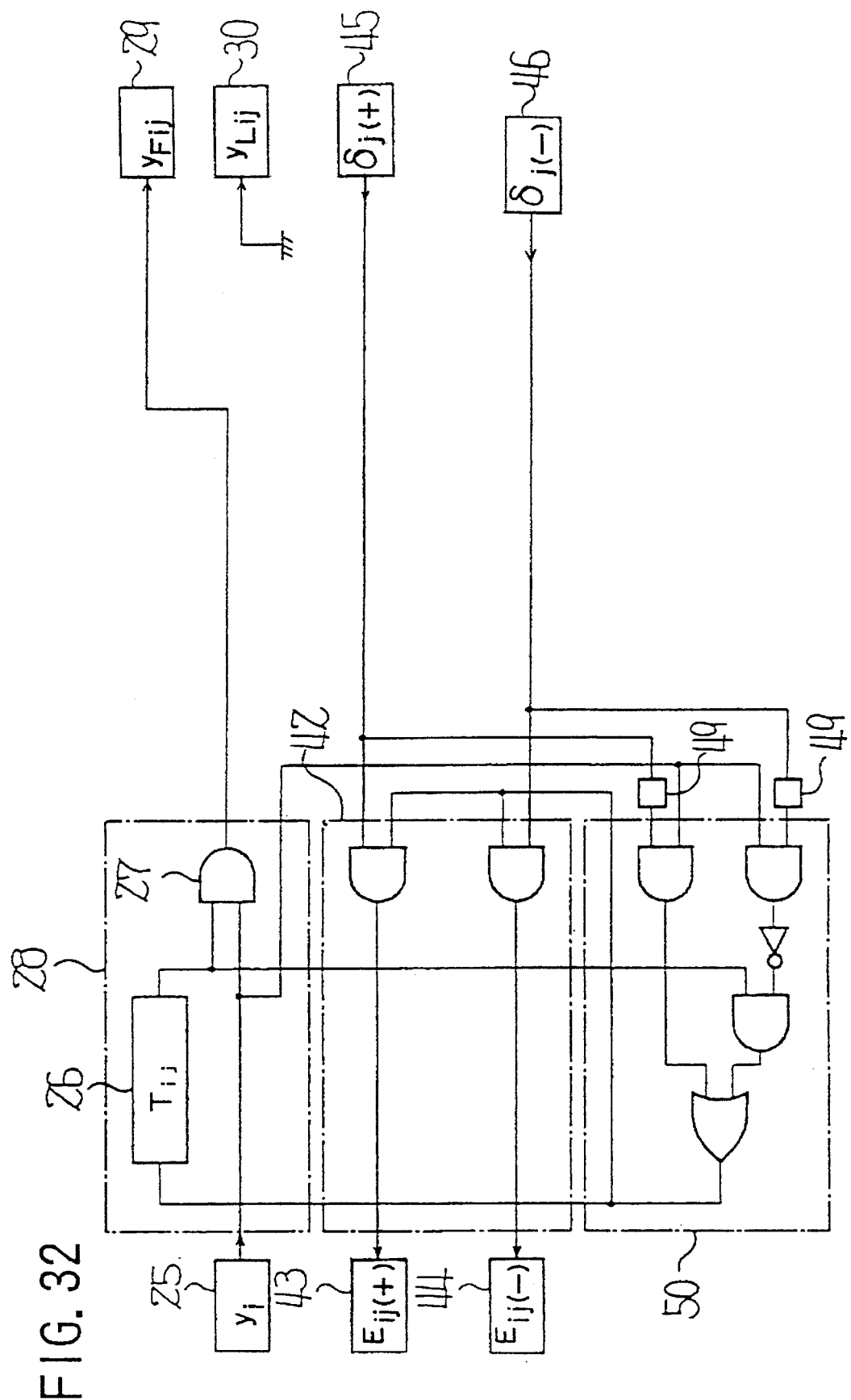
FIG. 32 is a logic circuit diagram showing a part of the construction of the first embodiment.

If there is no need for switching, the outputs may be fixed. For example, FIG. 32 shows the case of the excitatory group, and FIG. 33 shows the case of the inhibitory group. The circuits shown in FIGS. 32 and 33 are equivalent to the circuits of FIG. 31 in which the bit stored in the memory 31 is fixed to be "0" or "1", respectively. Alternatively, a shift register indicating an excitatory coupling and a shift register indicating an inhibitory coupling may be provided for a single input. FIG. 34 shows an example of such a configuration. In FIG. 34, 26A indicates a shift register for the weight function indicating an excitatory coupling, and 26B indicates a sift register for the weight function indicating an inhibitory coupling.

In addition, as shown in FIG. 8, gate circuits 33a and 33b which include a plurality of OR gates, and which perform an input process (corresponding to FIG. 13) are provided. A gate circuit 34 includes an AND gate 34a and an inverter 34b and outputs an output signal "1" only when the output of the excitatory group is "1" and the output of the inhibitory group is "0", as described in conjunction with FIG. 14. Similarly, the process results as shown in FIGS. 13 through 17 may be obtained by means of logic circuits.

Figure 36A:
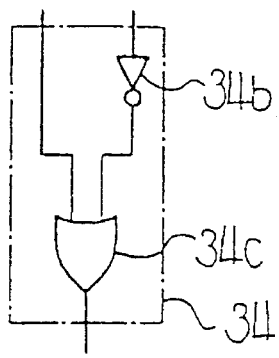
FIGS. 36A, 36B and 36C are logic circuit diagrams showing variations of a part of the construction of the first embodiment.
Figure 36B:
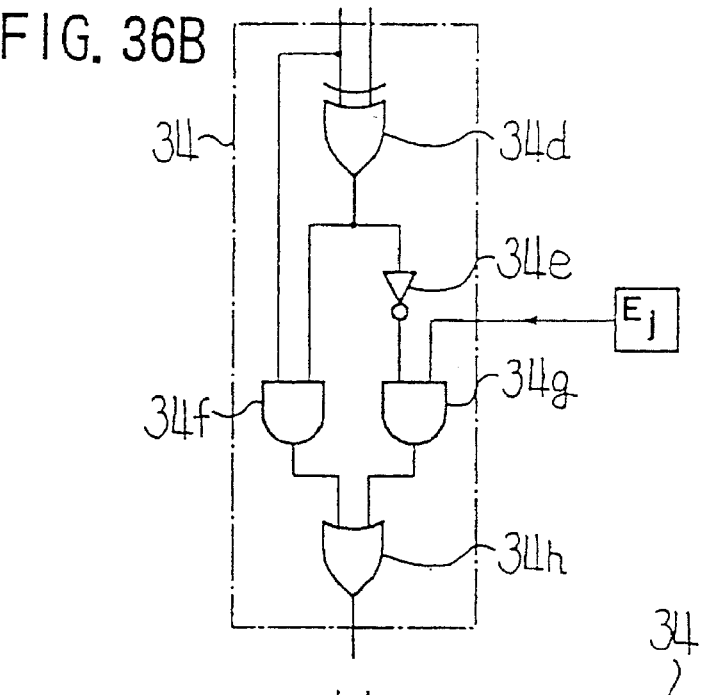
Figure 36C:
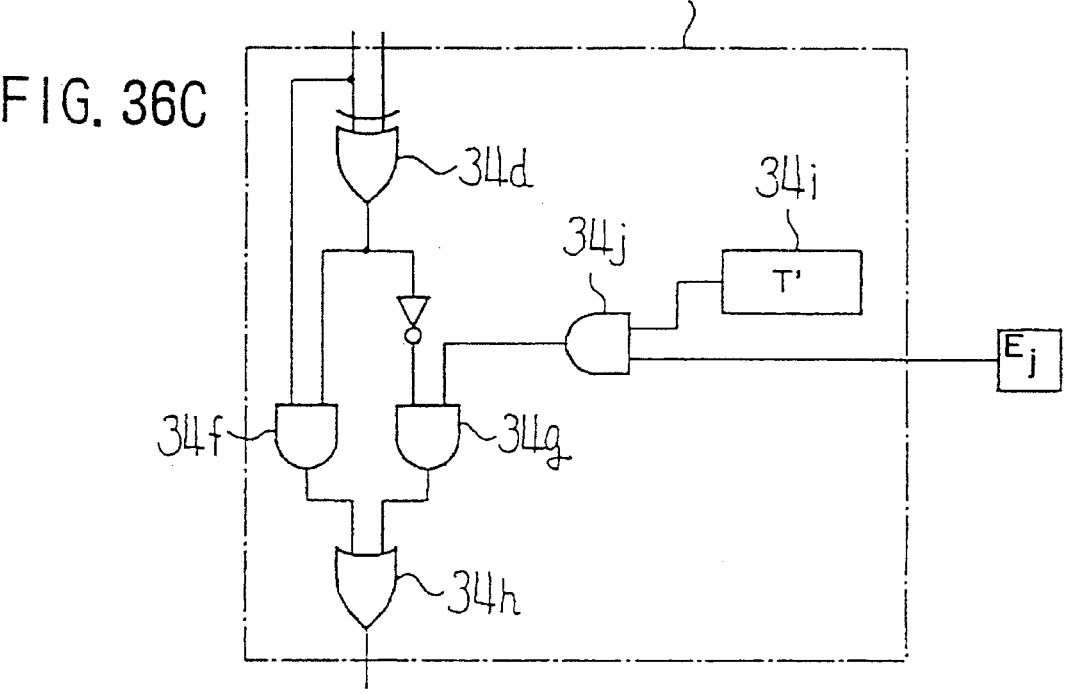

The gate circuit 34 is constructed of the inverter 34b and the OR gate 34c as shown in FIG. 36A if the method as indicated in FIG. 13 is employed. As shown in FIG. 36B, if the method as indicated in FIG. 16 is employed, the gate circuit 34 is constructed of an exclusive-OR gate 34d, an inverter 34e, two AND gates 34f and 34g and an OR gate 34h, wherein the second input $E_j$ is fed to the input of the AND gate 34g. If the method as indicated in FIG. 17 is employed, a construction shown in FIG. 36C, which is obtained as a result of adding to the circuit construction of FIG. 36B a memory 34i for storing the coefficient T' for the second input $E_j$ in a numerical representation and an AND gate 34j, is used.

Next, a description will be given of the error signal. A logic circuit 35 shown in FIG. 35 includes two AND gates and one exclusive-OR gate and generates error signals in the final layer. This logic circuit 35 corresponds to the equations (6) and (7). In other words, the logic circuits 35 generates error signals 38 and 39 based on an output signal 36 of the final layer and a teaching signal 37.

The calculation, indicated in the equation (34), of the error signals $E_{j(+)}$ and $E_{j(-)}$ in the intermediate layer is carried out by a gate circuit 42 shown in FIG. 31 which includes two AND gates. The gate circuit 42 outputs output signals 43 and 44 depending on positive and negative signals. Although the weight function obtained after a learning is used in this case, the weight function before a learning may also be used. This can also be realized by a circuit. The calculation is carried out for two cases, that is, for the case where the coupling is excitatory and the case where the coupling is inhibitory. A gate circuit 47 which includes four AND gates and two OR gates determines which one of the cases the calculation is to be carried out based on the bit stored in the memory 31 and the positive and negative signals 45 and 46. The circuits of FIG. 32 and 32 in which the output is fixed to represent an excitatory coupling or an inhibitory coupling, respectively, are equivalent to the circuit obtained by fixing the content of the memory 31 to be "0" and "1", respectively. The circuit of FIG. 34, which circuit includes two shift registers for an input, namely a shift register 26A indicating an excitatory coupling and a shift register 26B indicating an inhibitory coupling 26B, is shown to include gate circuit 35 which corresponds to the circuit represented by the equation (36).

Gate circuit 48a and 48b which include OR gates as shown in FIG. 8 carry out the calculations according to the equation (8) for obtaining an error signal, that is, the remaining part of the equation (34). Furthermore, the calculation to obtain the learning rate as described in conjunction with FIGS. 25 and 26 is carried out by a frequency dividing circuit 49 shown in FIG. 33. This can be easily realized by using a flip-flop or the like. If the frequency dividing circuit 49 is not necessary, it may be omitted. When the frequency dividing circuit 49 is provided, it is not limited to the arrangement shown in FIG. 32, and it may be provided in appropriate positions as indicated by a numeral 49 in FIGS. 31–34.

In such a process for collecting error signals, two kinds of differential coefficients $f_{j(+)}'$ and $f_{j(-)}'$ are calculated by a differential coefficient calculating means 51 on the basis of the output signal from the neuron 20 which signal is obtained through the gate circuit 34. The logical sums of the differential coefficients $f_{j(+)}'$ and $f_{j(-)}'$ and the error signals $E_{j(+)}$ and $E_{j(-)}$ collected through the gate circuits 48a and 48b are obtained respectively by means of a gate circuit 52 constructed of AND gates. This process of obtaining a logical product may be conducted before the frequency dividing process by means of the frequency dividing circuit 49 or after the frequency dividing process (for this reason, the frequency dividing circuit 49 may be provided at a position indicated by the numeral 49a in FIG. 8).

The differential coefficient calculating means 51 is divided into two parts, namely, a circuit 53 for processing the calculation of the differential coefficient $f_{j(+)}'$ and a circuit 54 for processing the calculation of the differential coefficient $f_{j(-)}'$. The circuit 53 executes the calculation of the equation (25) and is formed of a shift register 53a for obtaining a delayed signal $y_{dly'dj}$ by delaying the output signal $y_j$, an inverter 53b for obtaining a NOT signal of the output signal $y_j$ and an AND gate 53c for obtaining a logical product of the outputs of the shift register 53a and the inverter 53b. The circuit 54 executes the calculation of the equation (26) and is formed of a shift register 54a for obtaining a delayed signal $y_{dly'dj}$ by delaying the output signal $y_j$, an inverter 54b for obtaining a NOT signal of the delayed signal and an AND gate 54c for obtaining a logical product of the output of the inverter 54b and the output signal $y_j$. As for the shift registers 53a and 54a for delaying a signal by synchronizing it with the synchronization clock, the delaying amount being determined by the number of clock pulses may be fixed or variable by an external means.

Finally, a gate circuit 50 which includes three AND gates, an OR gate and an inverter as shown in FIG. 31 calculates the new weight function from the error signal. In other words, the gate circuit 50 performs the process indicated by the FIGS. 28–30. The content of the shift register 26, that is, the weight function $T_{ij}$ is rewritten into the new weight function which is calculated by the gate circuit 50. The gate circuit 50 also carries out the calculation for the case where the coupling is excitatory and the case where the coupling is inhibitory, and one of these two cases is determined by the gate circuit 47. In the cases shown in FIGS. 32 and 33, where the output is fixed to represent an excitatory coupling and an inhibitory coupling, respectively, a circuit corresponding to the gate circuit 47 is not necessary. In the case of the method indicated by FIG. 34, both an excitatory coupling and an inhibitory coupling are assumed for a single input. Hence, the gate circuit 50a corresponds to the case of an excitatory coupling, and the gate circuit 50B corresponds to the case of an inhibitory coupling.

The value of the weight function is stored in the form of a pulse train in the shift register 26. The learning capability may be enhanced by modifying the arrangement of pulses while maintaining the pulse density at the same level (that is, while maintaining the value of the weight function at the same level). For an improved effect, processes as indicated by any of FIGS. 37A–37C may be executed with respect to the weight function.

Figure 37A:
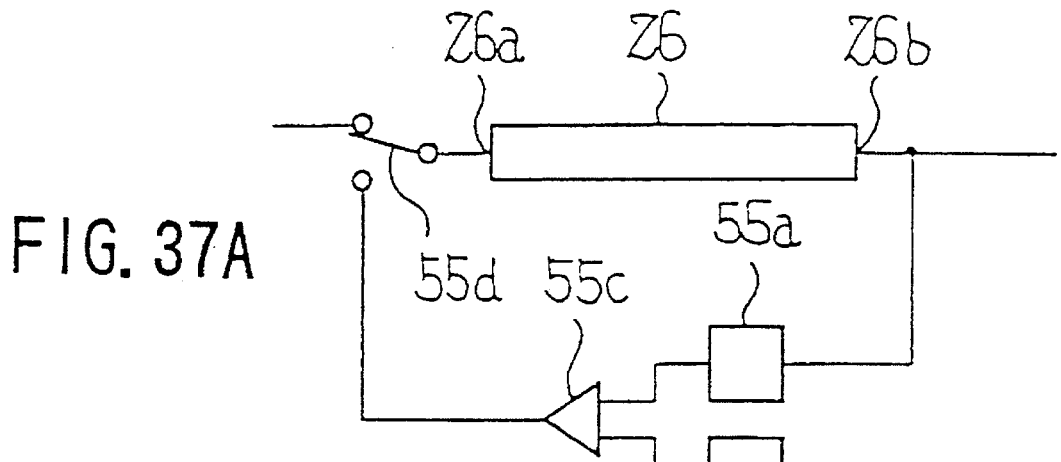
FIGS. 37A, 37B and 37C are block diagrams showing pulse arrangement converting means and converting means.

The circuit of FIG. 37A is configured such that a pulse arrangement modifying means 55 is added to the shift register 26 for storing the value of the weight function in the form of a pulse train. The pulse arrangement modifying means 55 includes a counter 55a for obtaining the number of pulses by counting the pulses read out from the shift register 26, a random number generating unit 55b for generating a random number, a comparator 55c for outputting either "1" or "0" depending on the result of comparison between the number of pulses and the random number generated, and a switching unit 55d for a writing into the shift register 26 depending on the output of the comparator 55c.

The random number generating unit 55b designates the number of bits read out from the shift register 26 (the number of synchronization clock pulses) as the maximum, and outputs a random number ranging between 0 and the maximum number. The comparator 55c is arranged to output "1" when the number of pulses is greater than the random number, and output "0" when the number of pulses is smaller than the random number. This causes the arrangement of the pulses in the pulse train associated with the weight function to be modified. While this process of modifying the pulse arrangement is being executed, the neural network is prohibited from executing its operation, because the switching unit 55d is operated to activate the comparator 55c.

Figure 37B:
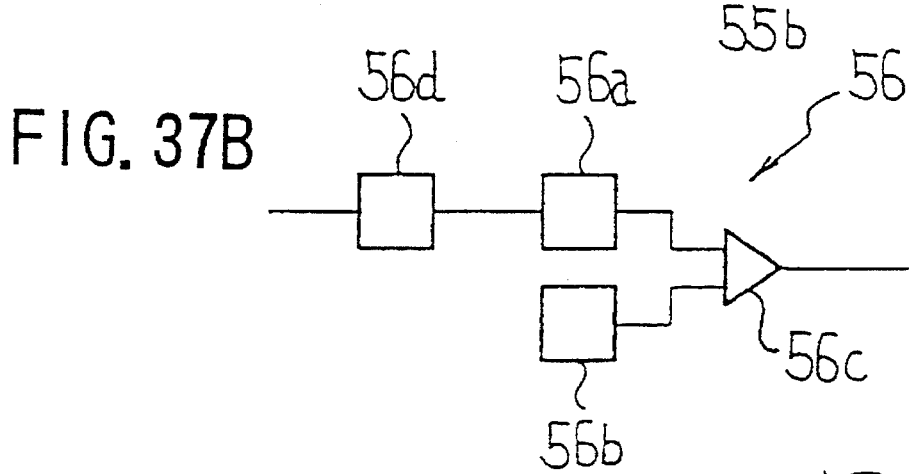

The circuit of FIG. 37B is configured such that a converting means 56 for converting, for each pulse, the value of the weight function into the representation of a pulse train is provided. That is, in this construction, the pulse density of the pulse train associated with the weight function is stored in the form of a numerical value (for example, a binary number or a voltage value) in a memory 56a. For each operation, a comparator 56c compares a random number generated by a random number generating unit 56b and the stored value, whereupon the pulse train is output. The pulse train indicating the weight function after a learning is calculated by means of a counter 56d so as to be converted into a numerical value. The content of the memory 56a is updated at predetermined intervals. The counter 56d may be replaced by an arrangement whereby an integrator is used to convert the pulse train indicating the weight function after a learning into a voltage value. As in the case of the random number generating unit 55b, the random number generating unit 56b is configured such that the maximum random number is equal to the number of synchronizing pulses for updating the content of the memory 56a.

Figure 37C:
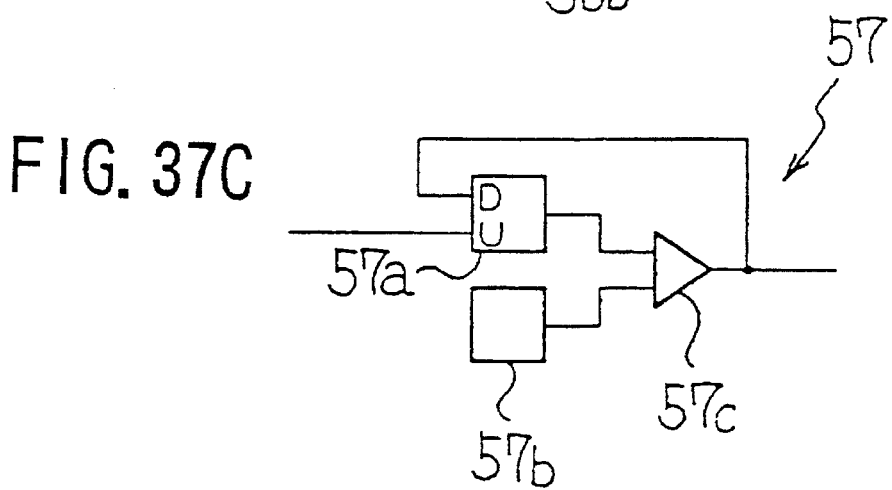

The circuit of FIG. 37C is configured such that a converting means 57 is provided so as to convert, for each operation, the value of the weight function into a pulse train. That is, in this construction, the pulse density of the pulse train indicating the weight function is stored in the form of a numerical value (for example, a binary number) in an up/down counter 57a. For each operation, the stored value is compared with a random number generated by a random number generating unit 57b by means of a comparator 57c, whereupon the pulse train is output. The pulse train indicating the weight function and output via the comparator 57c is fed back to the DOWN input of the counter 57a, and the pulse train indicating the weight function after a learning is fed to the UP input of the counter 57a. The stored weight function is modified as appropriate.

In the examples shown in FIG. 37A–37C, the random number generating units 55b, 56b and 57b as well as the comparators 55c, 56c and 57c may have a digital construction. When the integrator is used in place of the counter 56d, the random generating unit 56b and the comparator 56c may have a digital construction. This can be easily achieved using a known art. For example, a M sequence pseudo random generating unit may be used as a digital random generating unit, and thermal noise of a transistor may be used as an analog random number generating unit.

The representation of the weight function as the pulse density is useful not only in constructing actual circuit, but also in carrying out a simulation on a computer. Calculations are performed in a series in a computer. As compared with the calculation of analog values, the logical calculation on the binary numbers "1" and "0" is definitely superior in terms of calculation speed. Generally, the arithmetic operation of real numbers requires a lot of machine cycles for one session of calculation. However, fewer cycles are required for a logical operation. Another advantage of employing logical operations is that a low-level language adapted for a high-speed processing can be more readily applied. In the above described embodiment, it is to be noted that not all of the functions should be embodied by a circuit. A part or the whole of the functions may be realized by software means. The circuit configuration is not limited to the ones shown in the figures, but can be replaced by other circuits embodying the same logic. Also, negative logic may be employed. These considerations apply to the following embodiments as well.

Figure 38:
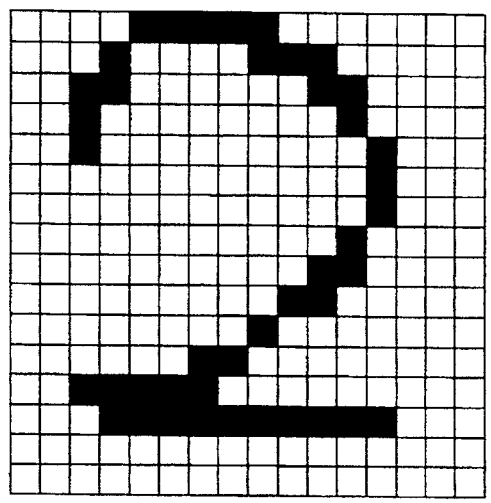
FIG. 38 is a diagram for explaining the reading of a handwritten character.

A description of a concrete example will be given. A network having three layers is constructed as shown in FIG. 2. The first layer of the neural network includes 256 neuron units, the second layer includes 20 neuron units and the third layer includes five neuron units. The neuron units in the first, second and third layers are connected to each other. A hand-written character is input to such a network for character recognition. First, a hand-written character is read by a scanner, and the read image is divided into 16×16 meshes as shown in FIG. 38. The data in each mesh is then applied to each neuron unit of the first layer in the neural network. For the sake of convenience, the data of a mesh which includes a portion of the character is taken as "1", while the data of a mesh which includes no portion of the character is taken as "0". The 256 pieces of data are input to the network (first layer). The five neuron units 20 of the third layer are corresponded to the numbers 1–5, respectively. The learning takes place so that when one of the numbers "1" through "5" is input to the neural network, the corresponding one of the five neuron units of the third layer outputs "1", and the remaining neuron units output "0". In other words, when the number "1" is input, the neuron unit of the third layer corresponding to the number "1" outputs the largest output. When the weight functions are set at a random value initially, the output result does not necessarily have a desired value. Thus, the self-learning function of this embodiment is used to obtain new weight functions. The self-learning is repeated to obtain a desired output to be obtained. Since the input is either "1" or "0", the input pulse train is a monotonous train consisting of low-level pulses or high-level pulses only. The final output is connected to an LED so that the LED is turned off when the output is at the low level, and the LED is turned on when the output is at the high level. Since the synchronization clocks having a cycle of 1000 kHz is used, the human eye can observe the change of brightness of the LED, the change depending on the pulse density. Accordingly, the brightest LED corresponds to the answer, that is, the recognition result. With respect to a character after sufficient learning, the recognition rate was 100%.

Figure 39:
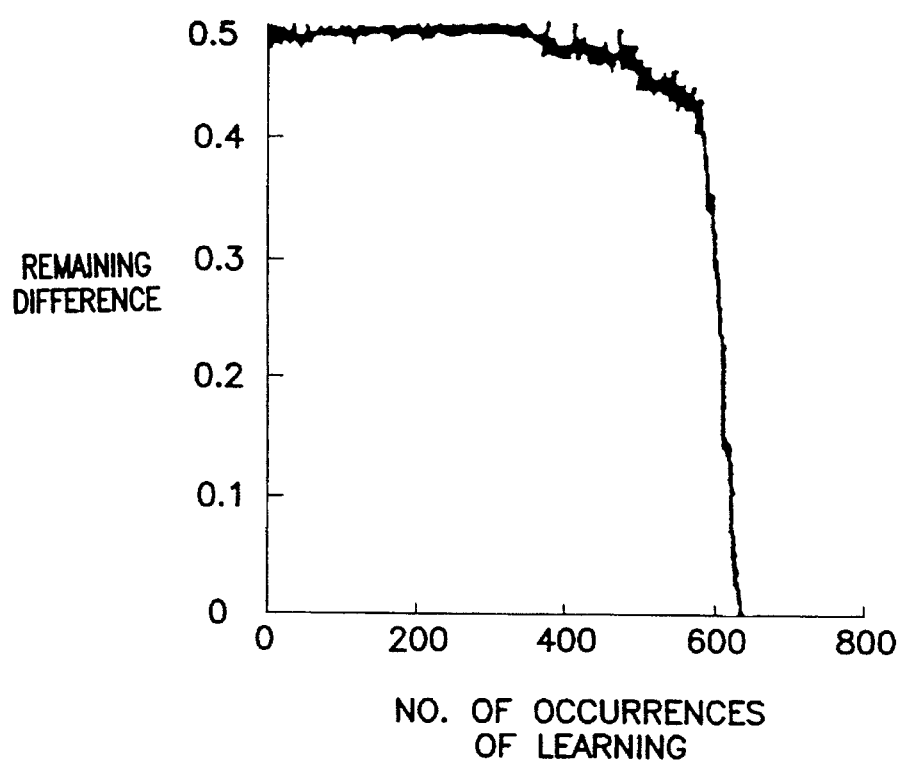
FIG. 39 is a graph showing the relationship between the number of occurrences of learning and the residual.

When the network constructed of three layers, the first layer including two neuron units, the second layer including two neuron units, and the third layer including four neuron units, was used to solve an XOR problem, the relationship between the number of occurrences of learning and the residual was as shown in FIG. 39. As indicated by FIG. 39, the network is found to be capable of a satisfactory learning in solving a difficult mathematical problem.

A description will now be given, with reference to FIGS. 40 through 45, of a second embodiment of the invention as described in claims 5 through 9. Those parts that are identical to the parts described in the first embodiment are denoted by the same reference numerals (this applies to the other embodiments that follow). These embodiments are more improved as compared with the first embodiment described above. The first embodiment described already will be reviewed.

The equations (25) and (26) shown again below are used to calculate the differential coefficient obtained by differentiating the output signal with respect to the internal potential so that the differential coefficient thus obtained can be used in a learning process.

$$f_{j(+)}' = \overline{y_{dty\,dj}} \cap y_j \quad (25)$$

$$f_{j(-)}' = \overline{y_{dty\,dj}} \cap y_j \quad (26)$$

When a learning is performed, the differential coefficients $f_{j(+)}'$ and $f_{j(-)}'$ are used to calculate the error signals. In the case of the output layer, the error signals are calculated according to the equations (27) and (28). In the case of the intermediate layer, the equation (33) is used (shown again below).

$$\delta_{j(+)} \equiv y_j \cap d_j \cap f_{j(+)}' \quad (27)$$

$$\delta_{j(-)} \equiv y_j \cap d_j \cap f_{j(-)}' \quad (28)$$

$$\delta_{j(+)} = \left( \bigcup_{k \in \text{excitatory}} (\delta_{k(+)} \cap T_{jk}) \right) \cup \left( \bigcup (\delta_{k(-)} \cap T_{jk}) \right) \cap f_{j(+)}'$$

$$\delta_{j(-)} = \left( \bigcup_{k \in \text{excitatory}} (\delta_{k(-)} \cap T_{jk}) \right) \cup \left( \bigcup (\delta_{k(+)} \cap T_{jk}) \right) \cap f_{j(-)}'$$

(33)

According to the construction of the first embodiment, the pulse density of the signals of the differential coefficients $f_{j(+)}'$ and $f_{j(-)}'$ may become zero. When the pulse density of the differential coefficients $f_{j(+)}'$ and $f_{j(-)}'$ becomes zero, the pulse density of the error signals $\delta_{j(+)}$ and $\delta_{j(-)}$ becomes zero. When such a phenomenon occurs while a learning is being performed, the learning is terminated instantly, thereby preventing further learning from being effected.

It is to be noted that a sigmoid function is used as the output function in numerical operations in the neurons. The differential coefficient thereof approaches zero but does not become equal to zero. The second embodiment has been developed in view of this point, and is basically configured such that there is provided a differential coefficient regulating means for ensuring that the differential coefficient of the output function does not become zero.

Figure 40:
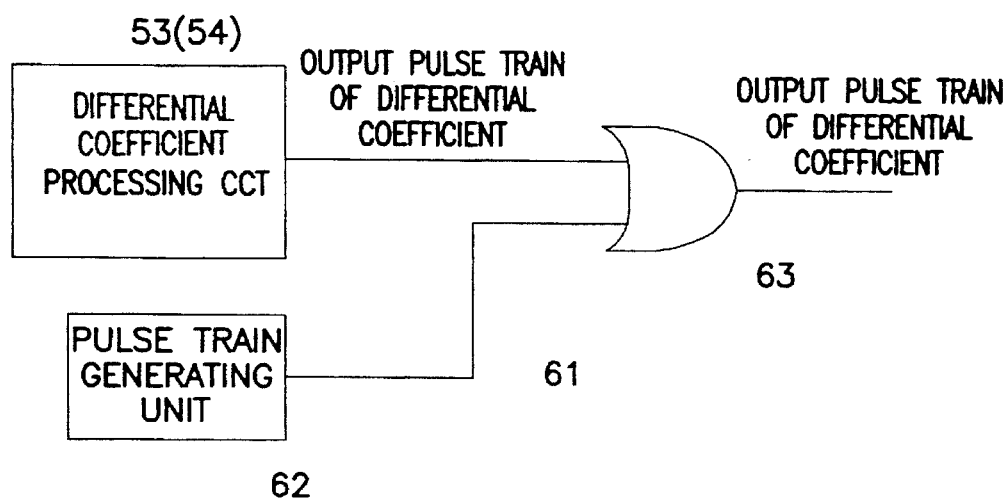
FIG. 40 is a block diagram showing a second embodiment of the invention claimed in claims 5 through 7.
Figure 41:
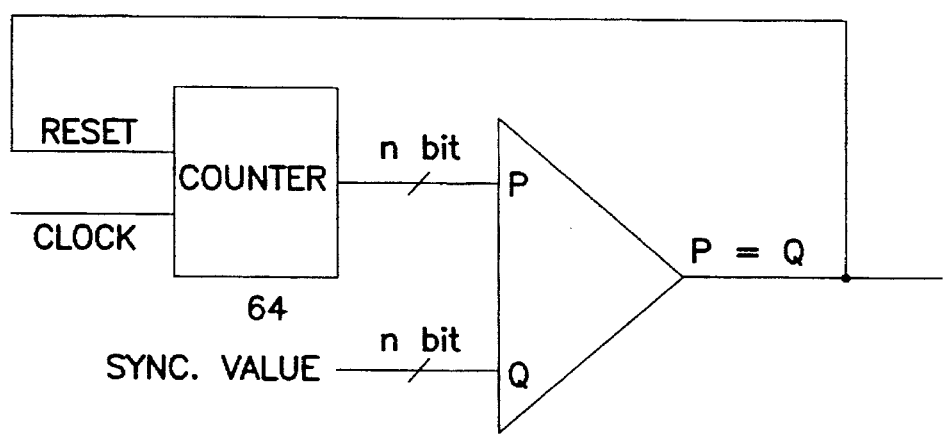
FIG. 41 is a block diagram showing the construction of a pulse train generating unit in the construction of FIG. 40.

The second embodiment, corresponding to the claims 5 through 7, will now be described with reference to FIGS. 40 and 41. First, it is to be noted that there is provided a processing circuit 53 (or 54) embodying the differential coefficient calculating means 51 of the first embodiment. A differential coefficient regulating means 61, which is the main point of the second embodiment, is added to the processing circuit 53 on the output side. The differential coefficient regulating means 61 applies an appropriate process on the pulse train associated with the weight function output from the processing circuit 53 so that the pulse density of the final output pulse train associated with the weight function does not become zero. The differential coefficient regulating means 61 is formed of a pulse train generating unit (pulse train generating means) 62 and an OR gate (operating means) 63 which receives as inputs the output of the pulse train generating unit 62 and the output of the processing circuit 53. The pulse train generating unit 62 generates a pulse train having a predetermined pulse density (a pulse density not equal to zero). For example, as shown in FIG. 41, the pulse train generating unit 62 includes a counter 64 which receives an input of a clock signal, and a comparator 65 which outputs a pulse "1" at a predetermined cycle, in other words, whenever the count of the counter 64 reaches a predetermined value.

According to such a construction, even when the pulse density of the output pulse train associated with the differential coefficient and output from the processing circuit 53 becomes zero, the pulse density of the final output pulse train associated with the differential coefficient does not become zero because the final output pulse train associated with the differential coefficient is obtained such that an OR of the output from the processing circuit 53 and the pulse train generated by the pulse train generating unit 62 is obtained by means of the OR gate 63. Thus, there is no likelihood that the pulse density of the pulse train associated with the differential coefficient becomes zero while a learning is being performed. Preferably, the pulse density of the pulse train output from the pulse train generating unit 62 is as near zero as possible so as not to affect the pulse train, associated with the differential coefficient, output from the processing circuit 53.

Figure 42:
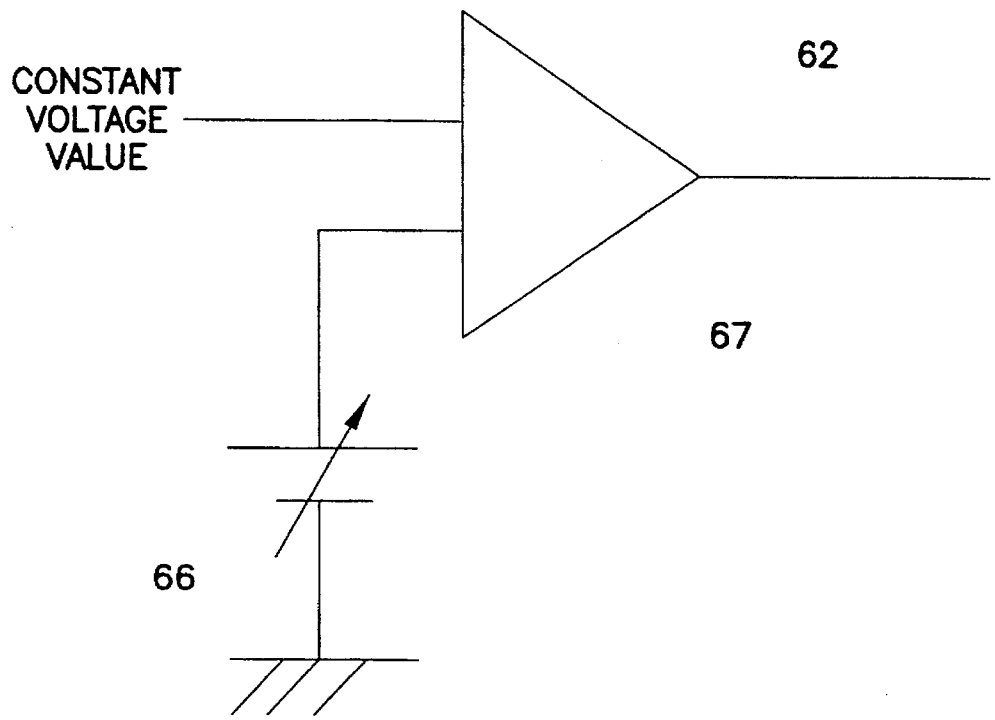
FIG. 42 is a block diagram showing a third embodiment of the invention claimed in claim 8.

A third embodiment described in claim 8 is explained in FIG. 42. This embodiment is configured such that the construction of the pulse train generating unit 62 is modified. A pulse train generating unit in this embodiment is formed of an analog random number generating unit 66 and a comparator 67. For example, the voltage value affected by thermal noise of a transistor is used to construct the random number generating unit 66. A desired pulse train is obtained such that the comparator 67 compares the output of the random number generating unit 66 and a predetermined constant voltage value, and such that "1" is output when the voltage value of the random number generating unit 66 is greater than the constant voltage value, and "0" is output when it is smaller. The pulse density of the pulse train can be adjusted as required by modifying the distribution of the voltage value obtained from the random number generating unit 66 and the constant voltage that is used in comparison.

Figure 43:
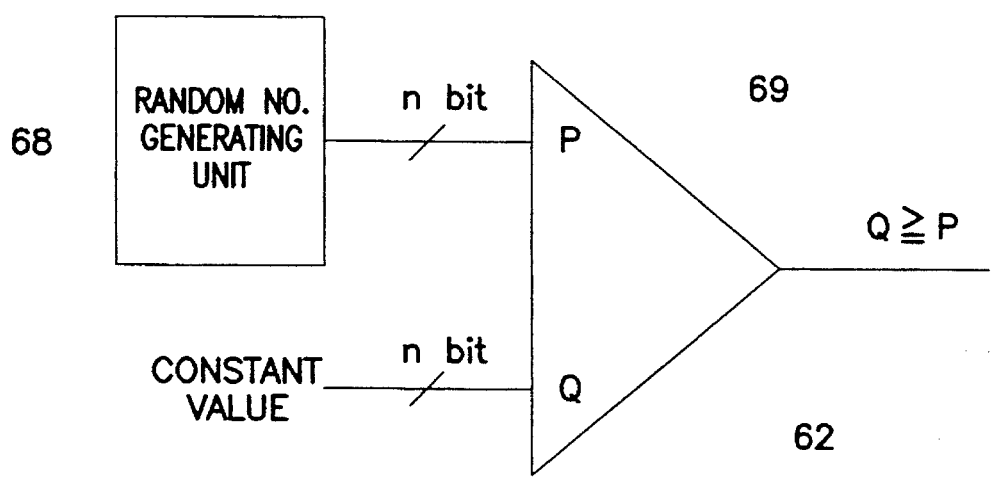
FIG. 43 is a block diagram showing a fourth embodiment of the invention claimed claim 9.
Figure 44:
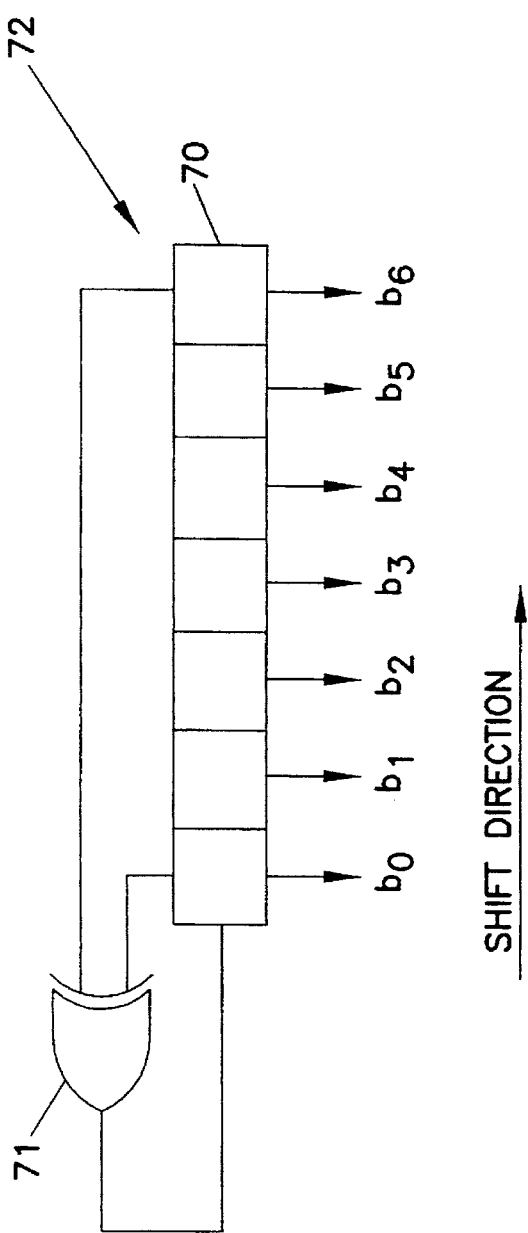
FIG. 44 is a block diagram showing the construction of a random number generating unit of the construction of FIG. 43.

FIGS. 43 and 44 shows a fourth embodiment described in claim 9. This embodiment is also characterized in that a variation of the pulse train generating unit 62 is provided. A pulse train generating unit in this embodiment includes a digital random number generating unit 68 and a digital comparator 69. As shown in FIG. 44, a linear feedback shift register (LFSR) 72, formed of a 7-bit shift register 70 and an exclusive-OR gate 71 which receives as inputs the most significant bit and the least significant bit of the data in the 7-bit shift register 70 so as to update the least significant bit in the register 70 at intervals, is used as the random number generating unit 68. With this arrangement, the 7-bit random number ranging between 1 and 127 is obtained from the random number generating unit 68. The comparator 69 compares the random number with the 7-bit predetermined constant value (for example, values like 1 or 2). The comparator 69 outputs "1" when the random number is greater than the constant value, and outputs "0" when it is smaller. As a result of this, the pulse train having the pulse density of 1/127, 2/127 or the like, for example, is obtained. The final pulse train associated with the differential coefficient and output from the OR gate 63 has a pulse density of 1/127, 2/127 or the like at least.

Figure 45:
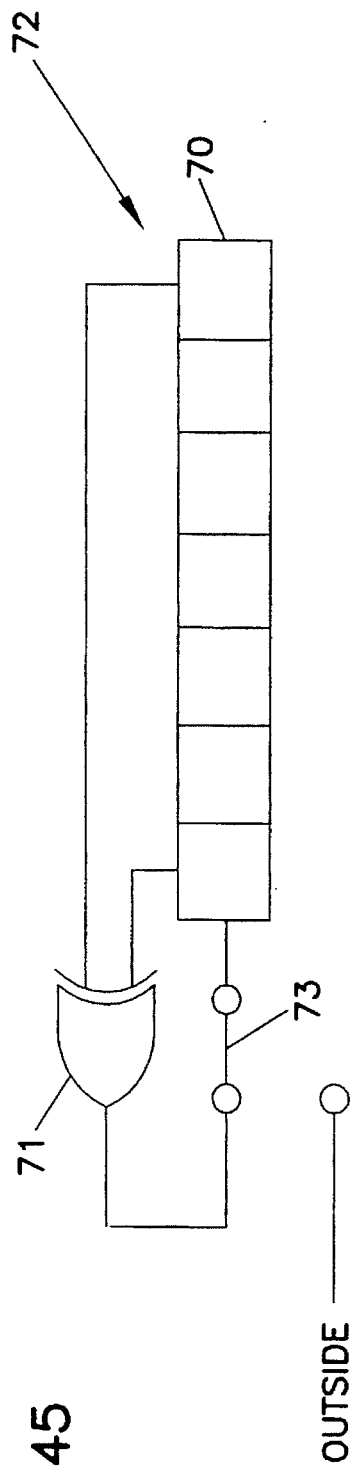
FIG. 45 is a block diagram showing a variation of the random number generating unit of FIG. 44.

It is necessary to set a value other than zero in the LFSR 72 initially. In order to do this, a switch 73 is disposed between the exclusive-OR gate 71 and the 7-bit shift register 70, as shown in FIG. 45, so that the initial value of the LFSR 72 can be set from outside.

While this embodiment has been described as having the construction wherein the differential coefficient regulating means 61 is provided in the processing circuit 53. However, since two kinds of differential coefficients $f_{j(+)}'60$ and $f_{j(-)}'$ are needed as described in the first embodiment, it is necessary that the differential coefficient regulating means 61 is also provided in the processing circuit 54 so as to ensure that neither of the differential coefficients becoms zero. When the random number generating units 66 and 68 are provided for the processing circuits 53 and 54, respectively, it is desirable that the random generating units 66 and 68 generate different random numbers. It is further to be noted that a large number of random number generating units in the network generate different random numbers.

A specific construction of the fourth embodiment will now be described. A total of 16 neuron units 20 are produced on a single chip by means of an ordinary LSI process. The number of synapses for each neuron 20 is determined to be 16. The pulse train generating unit 62 of FIG. 40 is formed of the LFSR 72 and the digital comparator 69, as shown in FIGS. 43 adn 44 so that the pulse train having a pulse density of 1/127 is generated. As a result of this arrangement, it is ensured that the final pulse train associated with the differential coefficient has a pulse density of at least 1/127, and that there is no likelihood that a learning process is terminated in the middle.

A description will be given of a fifth embodiment described in claim 10, with reference to FIGS. 46 through 50. In the aforementioned embodiments, the basic configuration is such that the output signal from the neuron 20 is represented as a pulse train, and the value of the weight function is stored in the form of a pulse train. In this embodiment, the value of the weight function is stored in a numerical representation, that is, as a binary number. In this sense, this embodiment is suggested by the construction as shown in FIG. 37B but is more specific in its implemention of the concept.

Figure 46:
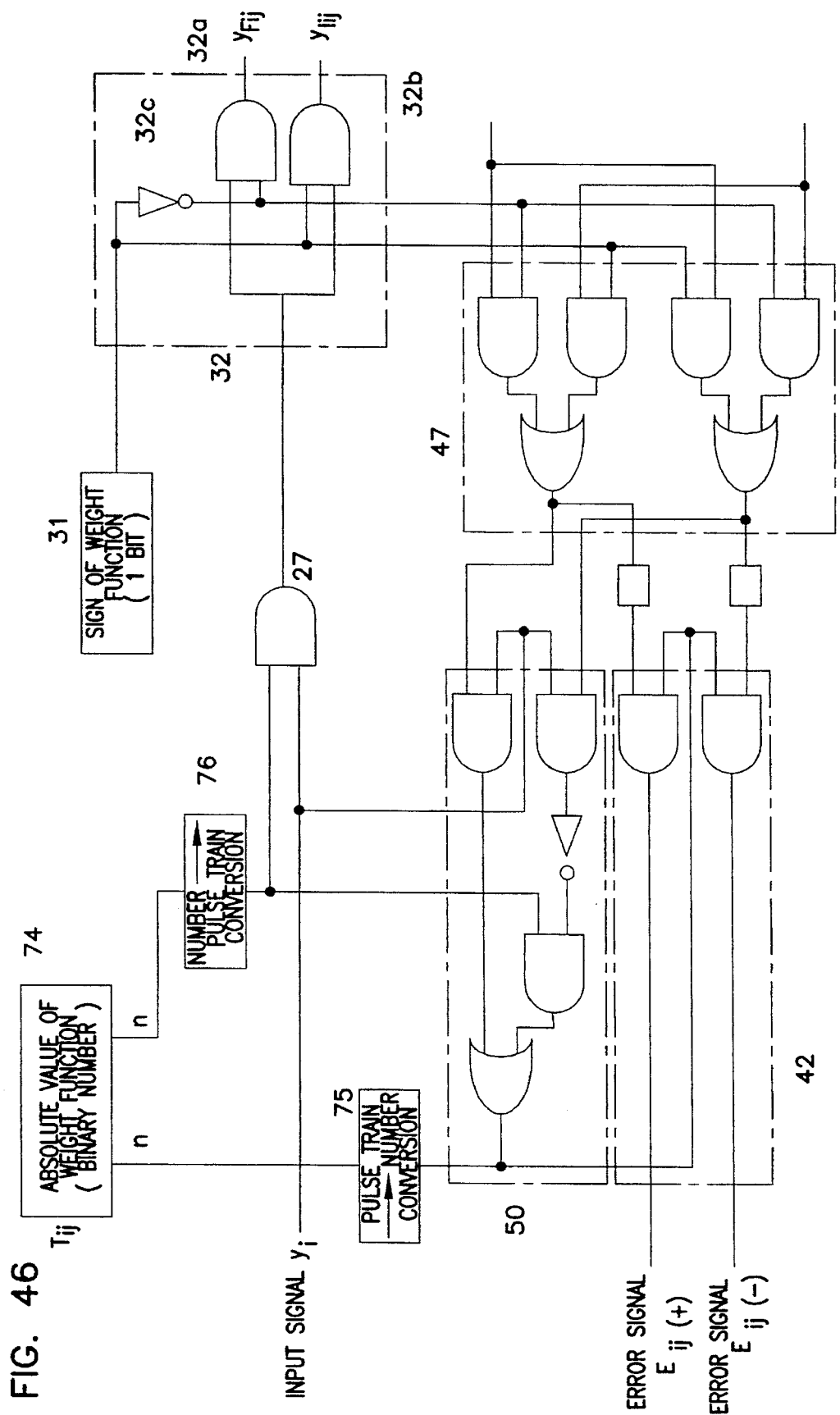
FIG. 46 is a logic circuit diagram showing the synapse part of a fifth embodiment of the invention claimed in claim 10.
Figure 47:
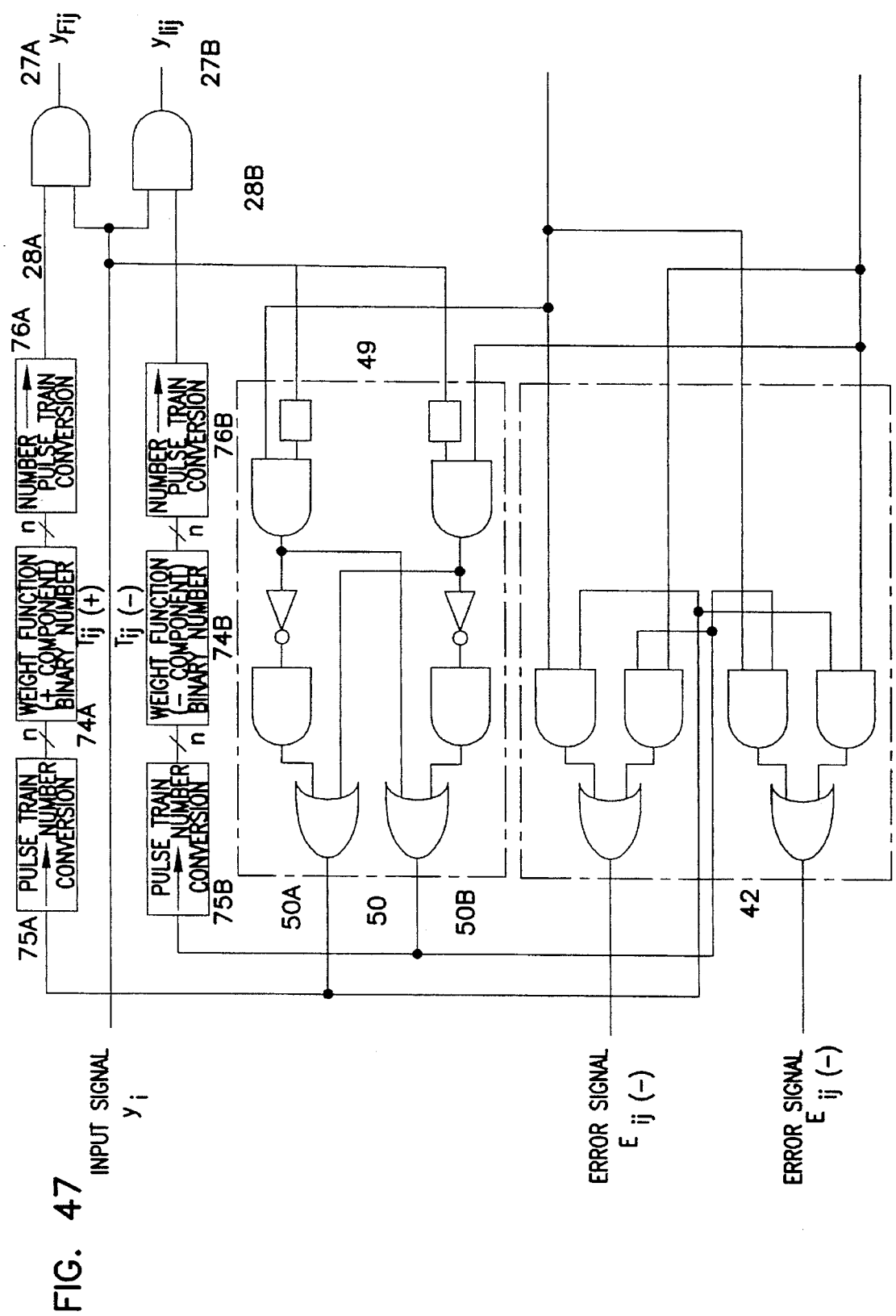
FIG. 47 is a logic circuit diagram showing a variation of the construction of FIG. 46.
Figure 48:
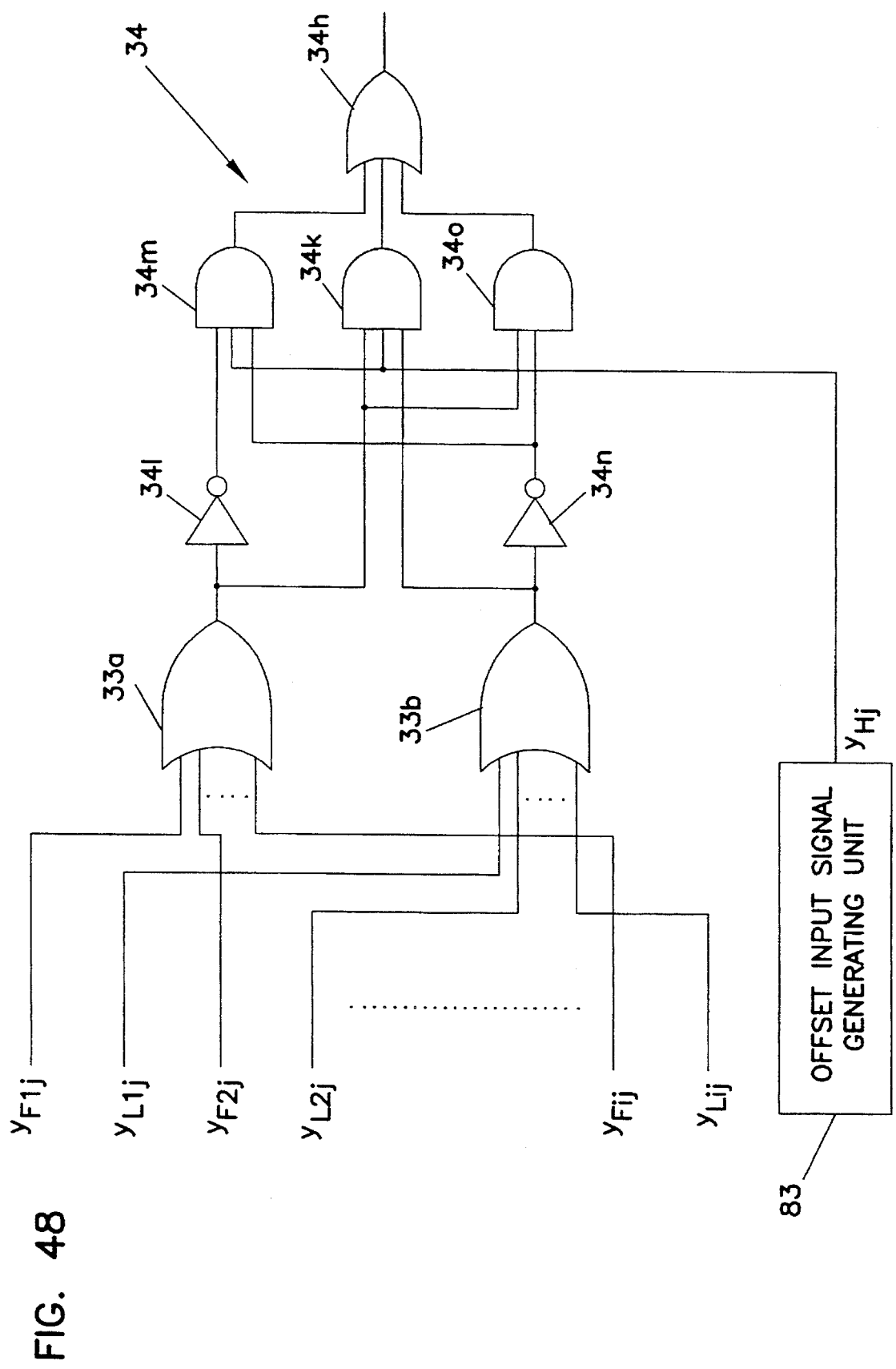
FIG. 48 is a logic circuit diagram showing a part of the construction of a neuron unit.

FIGS. 46 and 47 show the construction of a synapse part and correspond to FIGS. 31 and 34, respectively. FIG. 48 shows a part of the construction of a neuron unit 20 and corresponds to FIG. 8.

In the construction of synapse part shown in FIG. 46, a memory 74 for storing the value of the weight function $T_{ij}$ as a binary number (absolute value) is provided instead of the shift register 26. The input (on the output side of the gate circuit 50) of this memory 74 is connected to a pulse train→number converting circuit 75, and the output (on the input side of the AND gate 27) of the memory 74 is connected to a number→pulse train converting circuit (number→pulse train converting unit) 76. A total of n lines corresponding to the bit width required to describe the number are used to connect the memory 74 with the number→pulse train converting circuit 76. Signals (not shown) such as an output enable signal and a write enable signal are provided to the memory 74 so as to enable reading and writing operations to/from the memory 74. The pulse train→number converting circuit 75 can be easily realized by using a counter or the like, as has been already described with reference to FIG. 37B. The other part of the circuit of FIG. 46 has the same configuration as the circuit of FIG. 31.

FIG. 47 shows an example in which both kinds of weight functions are provided, namely, the weight function indicating an excitatory coupling and the weight function indicating an inhibitory coupling. There are provided a memory 74A for storing, as a binary number, the value (+ component) of the weight function indicating an excitatory coupling, and a memory 74B for storing, as a binary number, the value (− component) of the weight function indicating an inhibitory coupling. Pulse train→number converting circuits 75A and 75B are provided for the memories 74A and 74B, respectively. Numerical value→pulse train converting circuits 76A and 76B are also provided for the memories 74A and 74B, respectively. The other part of the circuit of FIG. 47 has the same configuration as the circuit of FIG. 34.

Figure 49:
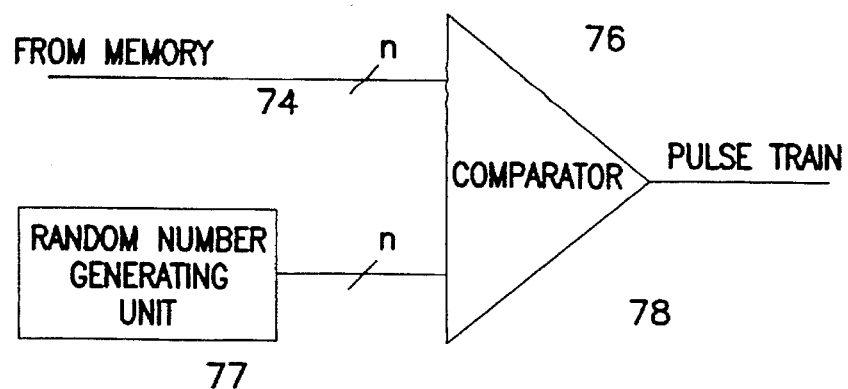
FIG. 49 is a block diagram showing the construction of a number→pulse train converting circuit.
Figure 50:
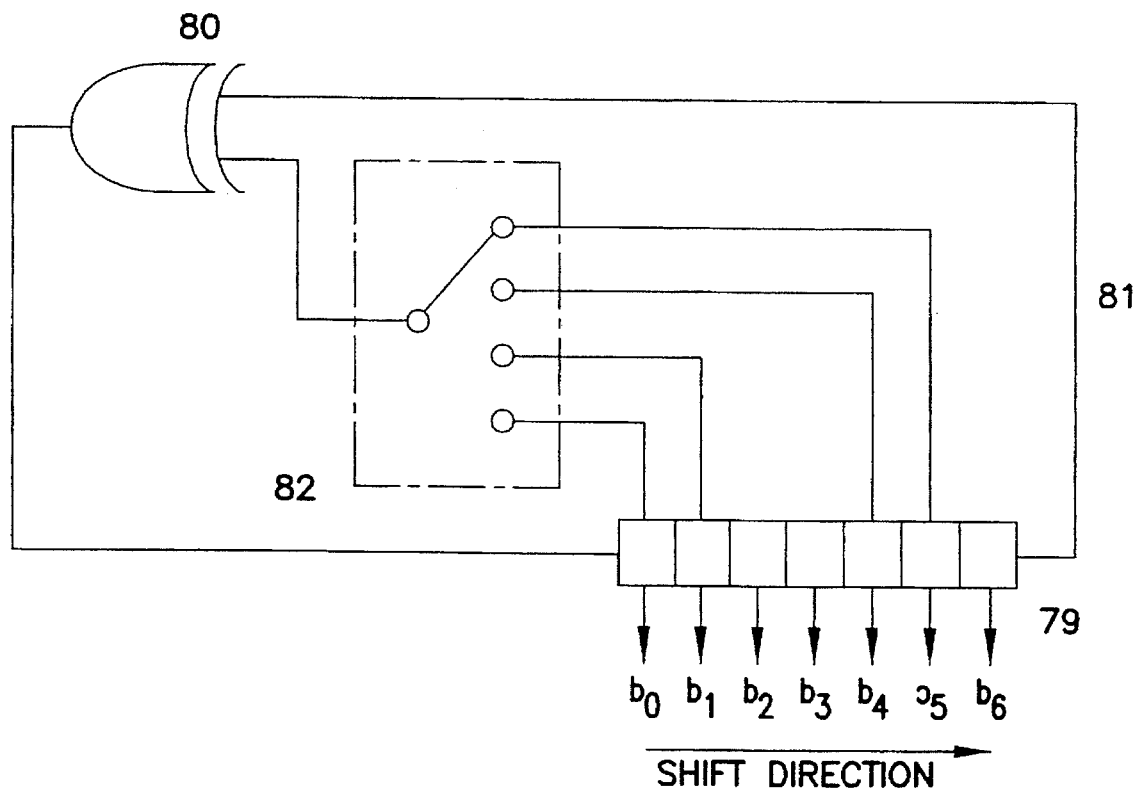
FIG. 50 is a block diagram showing the construction of a random number generating unit.

As shown in FIG. 49, the number→pulse train converting circuit 76 (76A and 7B) is formed of a random number generating unit 77 and a comparator 78 which compares the value of the weight function expressed as a binary number and stored in the memory 74 with the random number generated by the random number generating unit 77, and which outputs a weight function in a pulse train representation to the AND gate 27 (27A and 27B). As indicated in FIG. 50, the random number generating unit 77 is constructed of a linear feedback shift register (LFSR) 81 formed of, for example, a 7-bit shift register 79 which generates a random number by being synchronized with the reference clock, and an exclusive-OR gate 80 which receives as inputs the data in the most significant bit (b6) of the register 79 and the data in the appropriate one of the remaining bits of the register 79, and which updates the least significant bit (b0) of the register 79 at intervals. With this arrangement, a random number ranging between 0 and ($2^m-1$) (where m is the number of bits in the shift register 79) can be obtained. There are plurality of generator polynomials of the LFSR 81. A more random series of numbers can be obtained if the input is appropriately switched by a circuit. In this embodiment, a switch 82 is provided for switching the input to the exclusive-OR gate 80 such that one of the bits b0, b1, b4 and b5 is connected to the input of the exclusive-OR gate 80. The comparator 78 compares the random number generated by the random number generating unit 77 (LFSR 81) and the weight function provided by the memory 74. The comparator 78 outputs "1" when the data from the memory 74 is greater, and outputs "0" when it is smaller. With this arrangement, it is possible to obtain a weight function in the form of a pulse train having the pulse density of [the data provided by the memory $74/2^m$].

FIG. 48 shows that part of the neuron 20 whose main components are gate circuits 33a and 33b. The gate circuit 34 of FIG. 48, provided on the output side of the gate circuits 33a and 33b, is a variation of the gate circuit 34 shown in FIGS. 8, 36A, 36B and 36C. That is, the gate circuit 34 is formed of: an AND gate 34k which ANDs a signal from a offset input signal generating unit 83 and signals from the gate circuits 33a and 33b; an AND gate 34m which ANDs a signal obtained by inverting an output from the gate circuit 33a by means of an inverter 34l, a signal from the gate circuit 33b and a signal from the offset input signal generating unit 83; and an AND gate 34o which ANDs a signal obtained by inverting an output from the gate 33b by means of an inverter 34n, a signal from the gate circuit 33a and a signal from the offset input signal generating unit 83. Like the number→pulse train converting circuit 76, the offset input signal generating unit 83 is formed of an LFSR and is configured to output 0.5 as the pulse density (number) $y_{Hj}$. The other aspects of the construction is the same as that of FIG. 8.

This embodiment is configured such that the equation (39) is used instead of the equations (11)–(21). Specifically, if the result $y_{Ej}$ obtained for the excitatory group by means of the gate circuit 33a does not match the result $y_{Ij}$ obtained for the inhibitory group by means of the gate circuit 33b, the output $y_{Ej}$ is for the excitatory group is defined to be the output of the neuron. That is, when the result $y_{Fj}$ for the excitatory group is "0" and the result $y_{Ij}$ for the inhibitory group is "1", "0" is output. When the result $y_{Fj}$ for the excitatory group is "1" and the result $y_{Ij}$ for the inhibitory group is "0", "1" is output. When the result $y_{Fj}$ for the excitatory group and the result $y_{Ij}$ for the inhibitory group match, the signal $y_{Hj}$ having the pulse density of 0.5 and output from the offset input signal generating unit 83 is designated as the output from the neuron.

$$y_j = (y_{Fj} \cap \overline{y_{Ij}}) \cup (y_{Fj} \cap y_{Ij} \cap y_{Hj}) \cup (\overline{y_{Fj}} \cap \overline{y_{Ij}} \cap y_{Hj}) \qquad (39)$$

When the network, as shown in FIG. 2, built of three layers and based on this embodiment was tested for a self-learning capability in character recognition, a recognition rate of 100% was obtained after a sufficient learning of a character.

According to the invention described in claim 1, two kinds of differential coefficients of a neuron unit response function, needed when calculating an error signal to be used at the time of a learning process, corresponding to positive and negative error signals are obtained by means of a differential coefficient calculating means, the calculation being done by obtaining a differential of an output signal from the neuron unit with respect to an internal potential. Hence, a proper error signal is obtained and an improved learning capability is achieved. Especially, according to the invention described in claim 2, the output signal from the neuron unit is expressed in the form of a pulse train, a logical product of the delayed signal obtained by delaying the output signal from the neuron unit and a NOT signal of the output signal is used as a differential coefficient of the neuron unit response function, a logical product of a delayed signal obtained by delaying a NOT signal of the output signal from the neuron unit and the output signal is used as another neuron response function. With this arrangement, the possibility of the differential coefficient becoming zero is eliminated. In addition, according to the invention described in claim 3, there are provided a memory for storing the value of the weight function in the form of a pulse train, and a pulse arrangement modifying means for modifying the arrangement of the pulse train associated with the weight function and stored in the memory. According to the invention described in claim 4, there is provided a converting means for converting the value of the weight function into a pulse train, thus improving the learning capability.

According to the invention described in claims 5 and 6, it is ensured, by means of a differential coefficient regulating means, that the differential coefficient calculated by the differential coefficient calculating means does not have a value of zero or does not have a pulse density of zero, thus eliminating a possibility that the learning is terminated in the middle.

According to the invention described in claim 7, there is provided a differential coefficient regulating means formed of a pulse train generating means for generating a pulse train having a predetermined pulse density and of a calculating means for calculating a logical sum of the pulse train generated by the pulse train generating means and the output pulse train from the neuron. According to the invention described in claim 8, the pulse train generating means is formed of a random number generating unit and a comparator for comparing a random number output from the random number generating unit and a predetermined threshold value. According to the invention described in claim 9, the random number generating unit is formed of a linear feedback shift register. These aspects of the present invention makes it easy to realize the differential coefficient regulating means having the above described function.

The invention described in claim 10 results from providing the invention of claim 1 or claim 2 with a memory for storing the value of the weight function and a number→pulse train converting unit having a random number generating unit formed of a linear feedback shift register and of a comparator for comparing the value of the weight function stored in the memory with the random number generated by the random number generating unit and for outputting the weight function in the form of a pulse train. Since the value of the weight function is stored in the memory as a binary number and is output after being converted into a pulse train by means of the number→pulse train converting unit, the storing of the weight function is easy. Since the value is handled as the pulse train when being processed, the processing of the weight function is easy.

The present invention is not limited to the above described embodiments, and variations and modifications may be made without departing from the scope of the present invention.

What is claimed is:

1. A signal processing apparatus having a circuit network formed by connecting a plurality of neuron units into a network, said neuron unit being provided with self-learning means which comprises:

weight function varying means for varying a weight function of neurons; and weight function generating means which generates a variable weight function for the weight function varying means, on the basis of a positive or negative error signal obtained as a result of the comparison between an output signal and a teaching signal, said signal processing apparatus being provided with differential coefficient calculating means for calculating two kinds of differential coefficients of a neuron response function, on the basis of an output signal from neuron units so that said positive and negative error signals can be generated.

2. The signal processing apparatus as claimed in claim 1, wherein the output signal from the neuron unit is represented by a pulse train, a logical product of a delayed signal obtained by delaying by a predetermined time the output signal from the neuron unit and a NOT signal of said output signal is designated as a differential coefficient of a neuron response function, and a logical product of a delayed signal obtained by delaying by a predetermined time a NOT signal of the output signal from the neuron unit and said output signal is designated as another neuron response function.

3. The signal processing apparatus as claimed in claim 2, comprising a memory for storing the value of the weight function as a pulse train, and pulse arrangement modifying means for modifying at predetermined intervals the arrangement of a pulse train, stored in the memory, associated with the weight function.

4. The signal processing apparatus as claimed in claim 2, comprising converting means for converting the value of the weight function into a pulse train.

5. The signal processing apparatus as claimed in claim 1, comprising differential coefficient regulating means for regulating the value of the differential coefficient so as to ensure that neither of the two kinds of differential coefficients calculated by the differential coefficient calculating means has the value of zero.

6. The signal processing apparatus as claimed in claim 2, claim 3 or claim 4, comprising differential coefficient regulating means for regulating the value of the differential coefficient so as to ensure that neither of the two kinds of differential coefficients calculated by the differential coefficient calculating means has the pulse density of zero.

7. The signal processing apparatus as claimed in claim 6, wherein the differential coefficient regulating means is formed of pulse train generating means for generating a pulse train having a predetermined pulse density and a calculating means for obtaining a logical sum of the pulse train generated by the pulse train generating means and the output pulse train from the neuron unit.

8. The signal processing apparatus as claimed in claim 7, wherein the pulse generating means is formed of a random number generating unit and a comparator for comparing the random number output from the random number generating unit and a predetermined threshold value, and for outputting a pulse train.

9. The signal processing apparatus as claimed in claim 8, wherein the random number generating unit is formed of a linear feedback shift register.

10. The signal processing apparatus as claimed in claim 1 or claim 2, comprising a memory for storing the value of the weight function as a binary number and a number→pulse train converting unit including a random number generating unit formed of a linear feedback shift register and of a comparator for comparing the value of the weight function stored in the memory with a random number generated by the random number generating unit, and for outputting the weight function in the form of a pulse train.

* * * * *

UNITED STATES PATENT AND TRADEMARK OFFICE
CERTIFICATE OF CORRECTION

PATENT NO. : 5,588,090
DATED : December 24, 1996
INVENTOR(S) : Toshiyuki Furuta, Shuji Motomura, Takahiro Watanabe and David G. Stork It is certified that error appears in the above-identified patent and that said Letters Patent is hereby corrected as shown below:

Column 3, line 58, change "a" (second occurrence) to --$\underline{a}$--.

Column 3, line 59, change "a" to --$\underline{a}$--.

Column 4, line 9, change "Of" to --of--.

Column 21, line 60, change "$f_{j(+)}$'60" to --$f_{j(+)}$'--.

Column 21, line 64, change "becoms" to --becomes--.

Column 22, line 10, change "adn" to --and--.

Signed and Sealed this

Thirtieth Day of March, 1999

Q. TODD DICKINSON

Attest:

Attesting Officer

Acting Commissioner of Patents and Trademarks